US006753864B2

(12) United States Patent
Vienneau et al.

(10) Patent No.: US 6,753,864 B2
(45) Date of Patent: Jun. 22, 2004

(54) GRAPHICAL IMAGE PROCESSING WITH LEVELS OF USER ACCESS

(75) Inventors: Christopher Vienneau, Montreal (CA); Amit Parghi, Montreal (CA)

(73) Assignee: Autodesk Canada Inc., Quebec (CA)

( * ) Notice: Subject to any disclaimer, the term of this patent is extended or adjusted under 35 U.S.C. 154(b) by 296 days.

(21) Appl. No.: 10/079,187

(22) Filed: Feb. 20, 2002

(65) Prior Publication Data

US 2002/0154126 A1 Oct. 24, 2002

(30) Foreign Application Priority Data

Apr. 20, 2001 (GB) .............................................. 0109751

(51) Int. Cl.[7] .............................................. G06F 17/60
(52) U.S. Cl. ..................... 345/473; 349/741; 349/743; 705/51; 705/54
(58) Field of Search ................................ 345/473, 741, 345/743; 713/200, 201; 705/51, 52, 54, 57, 58

(56) References Cited

U.S. PATENT DOCUMENTS 5,457,491 A 10/1995 Mowry
5,982,388 A 11/1999 Nakagawa
6,269,380 B1 * 7/2001 Terry et al. .................. 707/200

FOREIGN PATENT DOCUMENTS

| EP | 1 037 167 A2 | 9/2000 |
| EP | 1 047 240 A2 | 10/2000 |
| WO | WO 01/11569 | 2/2001 |

* cited by examiner

Primary Examiner—Mark Zimmerman
Assistant Examiner—Michael Whelpley
(74) Attorney, Agent, or Firm—Gates & Cooper LLP

(57) ABSTRACT

A method of generating an executable graphic file for an animation. Graphic data defines first characteristics of an animation, which are accessible via locked parameters at a first level of user access. The graphic data also contains references to unlocked parameters stored as metadata in a metafile. The metadata preferably includes, for each unlocked parameter, a value field, a range of possible values and a description, thus making it possible to construct a user interface to modify second animation characteristics without modifying the graphic data. The graphic data is combined with rendering instructions, to form an executable animation file. Preferably the executable file cannot execute after a predetermined date. Multiple instances of the animation may be created by re-use and modification of the original metafile.

24 Claims, 29 Drawing Sheets

*Figure 9*

```
901  <?xml version="1.0" encoding="iso-8859-1"?>
902  <!DOCTYPE page SYSTEM "dlPage.dtd">
903
904  <page name="Julie" projectName="Unknown" graphicName="dave_scene"
905  date="13 novembre" description="Juju standalone" userId="castond">
906    <pageEntry referenceID="14">
907      <value data="9.0">
908        <type name="float" default="2.0">
909          <max>3.40282e+038</max>
910          <min>-3.40282e+038</min>
911        </type>
912      </value>
913      <description>election2_pies:certain</description>
914    </pageEntry>
915    <pageEntry referenceID="15">
916      <value data="2.4">
917        <type name="float" default="3.0">
918          <max>3.40282e+037</max>
919          <min>-3.40282e+037</min>
920        </type>
921      </value>
922      <description>election2_pies:undecided</description>
923  </pageEntry>
```

605

```
924      <pageEntry referenceID="184">
925        <value data="Localtown">
926          <type name="string" default="">
927            <maxLength>31</maxLength>
928            <invChars> . {}"</invChars>
929          </type>
930        </value>
931        <description>election2_pies:name</description>
932      </pageEntry>
933      <pageEntry referenceID="134">
934        <value data="vtx_exp">
935          <type name="enum" default="vtx_lin">
936            <pValue>vtx_lin</pValue>
937            <pValue>vtx_exp</pValue>
938            <pValue>vtx_exp2</pValue>
939            <pValue>pix_lin</pValue>
940            <pValue>pix_exp</pValue>
941            <pValue>pix_exp2</pValue>
942          </type>
943        </value>
944        <description>election2_pies:type</description>
945      </pageEntry>
946    
```

*Figure 10*

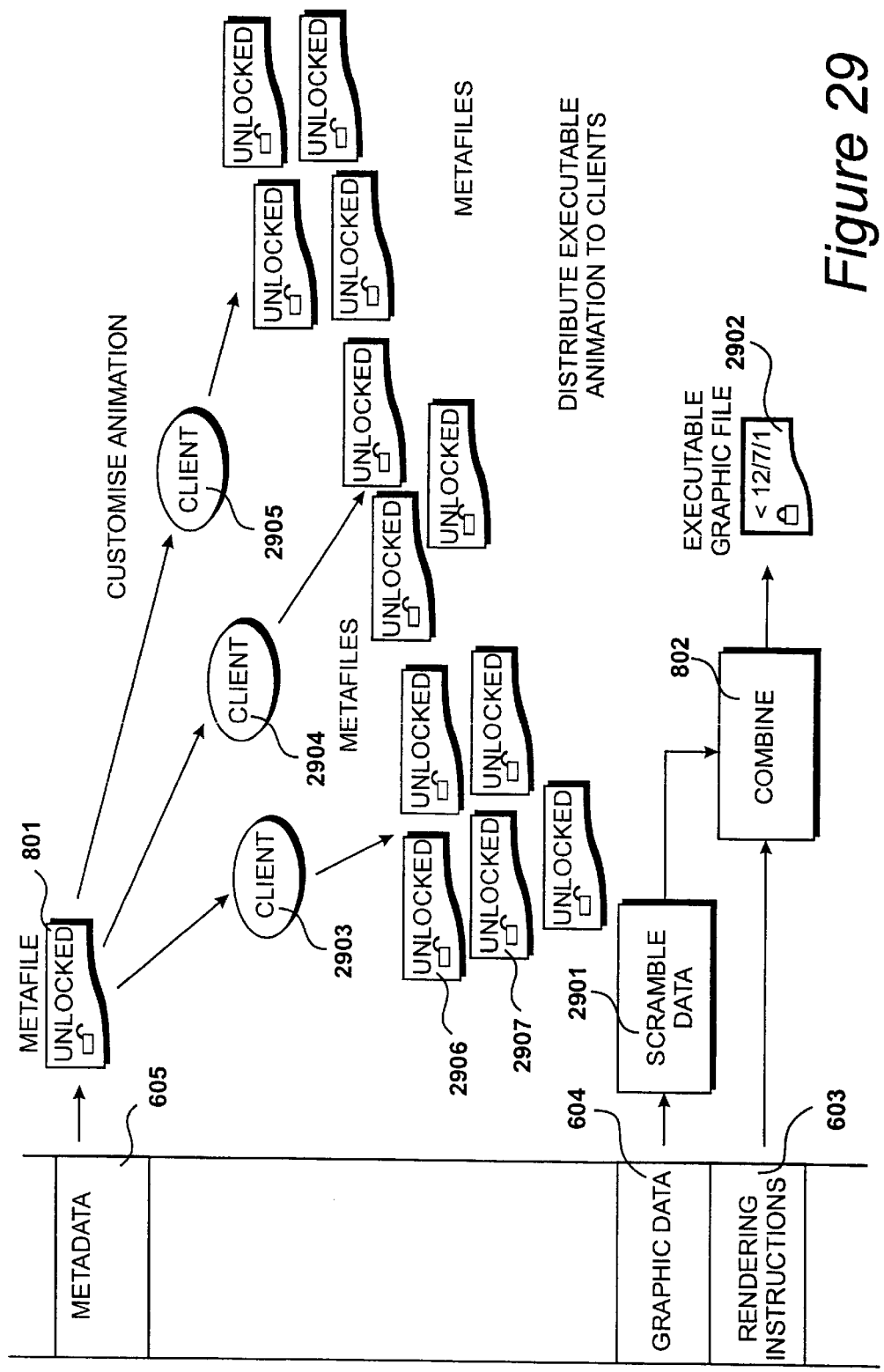

GRAPHICAL IMAGE PROCESSING WITH LEVELS OF USER ACCESS

BACKGROUND OF THE INVENTION

1. Field of the Invention

The present invention relates to generating animations, and in particular relates to customising distributed animation data.

2. Description of the Related Art

Animations are used widely in television broadcasting, as a useful graphical method for the presentation of information. For example, in an election broadcast, statistics can be presented in a way so as to communicate complex information to viewers. Such animations are usually generated digitally, relying on complex digital systems to render the information graphically, and to receive new data from an on-line database. Several graphics can be sequenced in time in what is referred to as a rundown, and the corresponding animation sequence can be cued manually or automatically by a studio automation system, such as that provided by the MOS (Media Object Server) protocol.

The design of such animations is a complex and time intensive process. All the objects of an animation are defined as combinations of primitive geometric shapes, such as cubes, spheres and so on. Surface textures, text fonts, and three dimensional views are all coordinated by the graphic designer to create the best effect. Animations comprise multiple moving objects, so as to provide a more exciting visual scene. In order to do this, the designer must define the motion, as well as the appearance, of objects contained in the animation. This can take considerable design effort. As the capabilities of animation processing systems increase, the possibilities for detail and visual richness put additional pressure on the designer.

Due to the high financial cost of this design effort, it is desirable to provide an end-user of the animation with a degree of editing capability, to allow their changing animation requirements to be met within practical budgets. Animations systems are therefore known which allow customisation of an animation by provision of an Application Programming Interface (API).

Although a cost effective customisation capability is required by the end-user, if it is unlimited, editing may be allowed which would be undesirable to the original animation designer. For example, some characteristics of an animation may contain valuable copyrighted graphic designs, trade marks, trade names, recognisable animated characters, etc., whose integrity the designer would wish to protect. It would therefore be advantageous for the designer to be able to restrict end-user access to certain characteristics of an animation while allowing editing of other, less critical characteristics.

BRIEF SUMMARY OF THE INVENTION

According to an embodiment of the present invention, there is provided an image data processing system for generating an executable animation file, comprising: data storage means storing first graphical data, second graphical data and rendering instructions; and processing means configured to combine said first graphical data and said rendering instructions, wherein said second graphical data comprises unlocked parameters defining second characteristics of said animation; said first graphical data comprises locked parameters defining first characteristics of an animation and references to said unlocked parameters; said combining process results in an executable animation file being generated, containing within it references to said unlocked parameters, such that: said first animation characteristics are editable only at a first level of user access, prior to said combination of first graphic data and rendering instructions; and said second animation characteristics are editable at a second level of user access, after said combining has taken place.

In a preferred embodiment the processing means is configured to execute steps to scramble the first graphic data contained in the executable file. Preferably the second graphical data comprises metadata, and for each of a plurality of unlocked parameters the metadata contains a specific value and an identifying means for identifying the corresponding unlocked parameter, to allow the construction of an interface for the unlocked parameters for user modification of the second animation characteristics. Preferably the rendering instructions include instructions to combine the rendered animation with other moving image data.

BRIEF DESCRIPTION OF THE SEVERAL VIEWS OF THE DRAWINGS

FIGS. 9 and 10 detail the metadata shown in FIG. 6;

FIG. 29 illustrates an overview of a preferred embodiment of the invention.

WRITTEN DESCRIPTION OF THE BEST MODE FOR CARRYING OUT THE INVENTION

Figure 1:
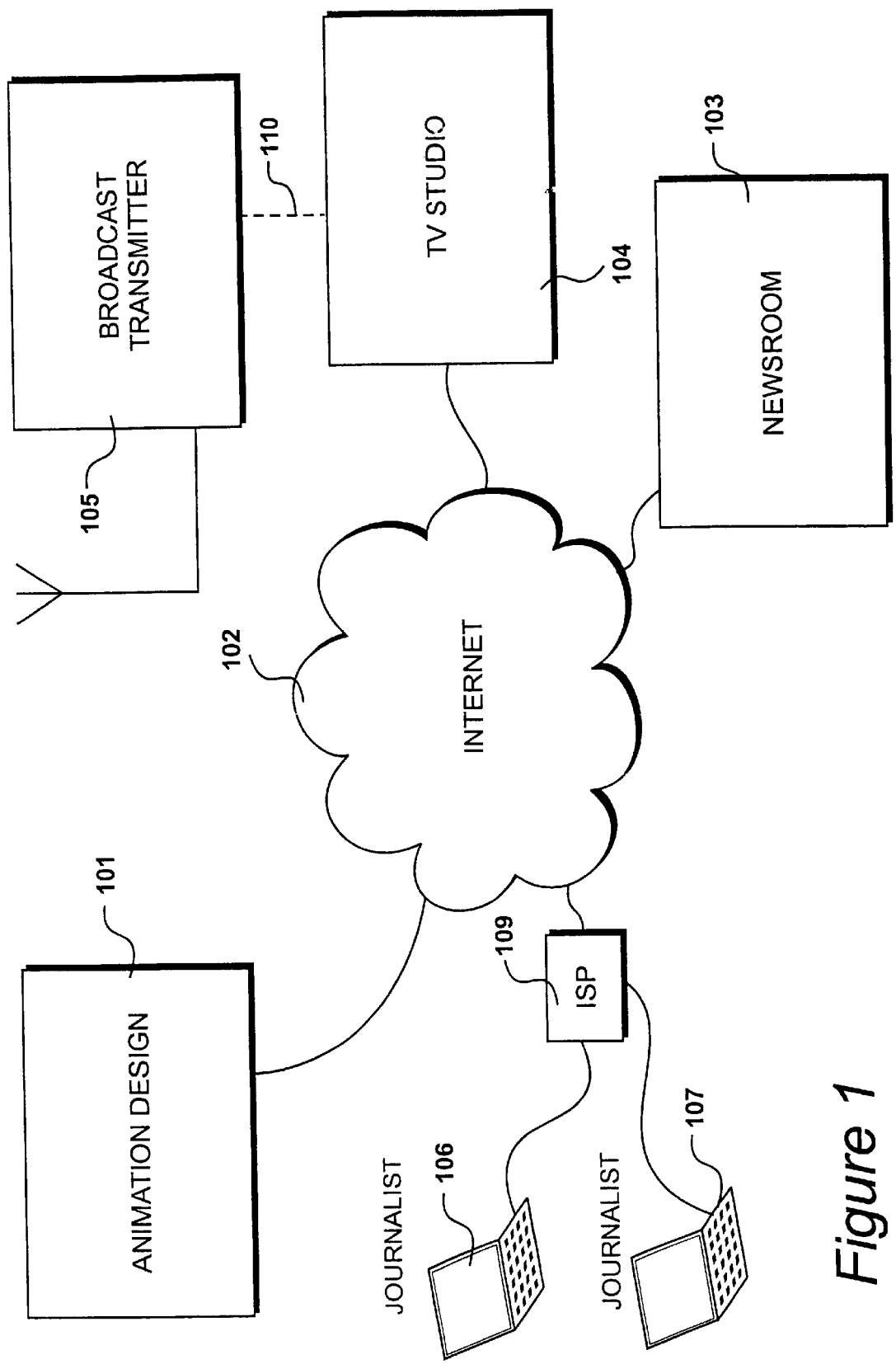
FIG. 1 shows a number of geographically separated sites across which animation data is shared, including an animation design house, a newsroom and a television studio.

A system for generating animations is shown in FIG. 1. Animations are initially created in an animation design house 101. The animations are designed for a specific purpose, for example, the enhancement of a television news program, in which news information is additionally presented in the form of graphical animations. An animation design, also known as a graphic, once complete, can be transferred via the Internet 102 to a newsroom 103. Alternative modes of transfer for the animation include physical transfer via CDROM, and local area networks that include both the newsroom 103 and the animation design house 101.

The newsroom 103 updates the graphic with current news data, and supplies these to a TV studio 104, where this information is integrated within the context of a news program for broadcast via a broadcast transmitter 105. Journalists using personal computers 106 and 107 may supply news data to the newsroom 103, by a modem connection to an Internet service provider (ISP) 109 which provides connectivity to the Internet 102. Connection between the newsroom 103 and the TV Studio is also made over the Internet. A microwave link 110 facilitates transfer of live audio and video broadcast signals from the TV studio 104 to the broadcast transmitter 105.

Figure 2:
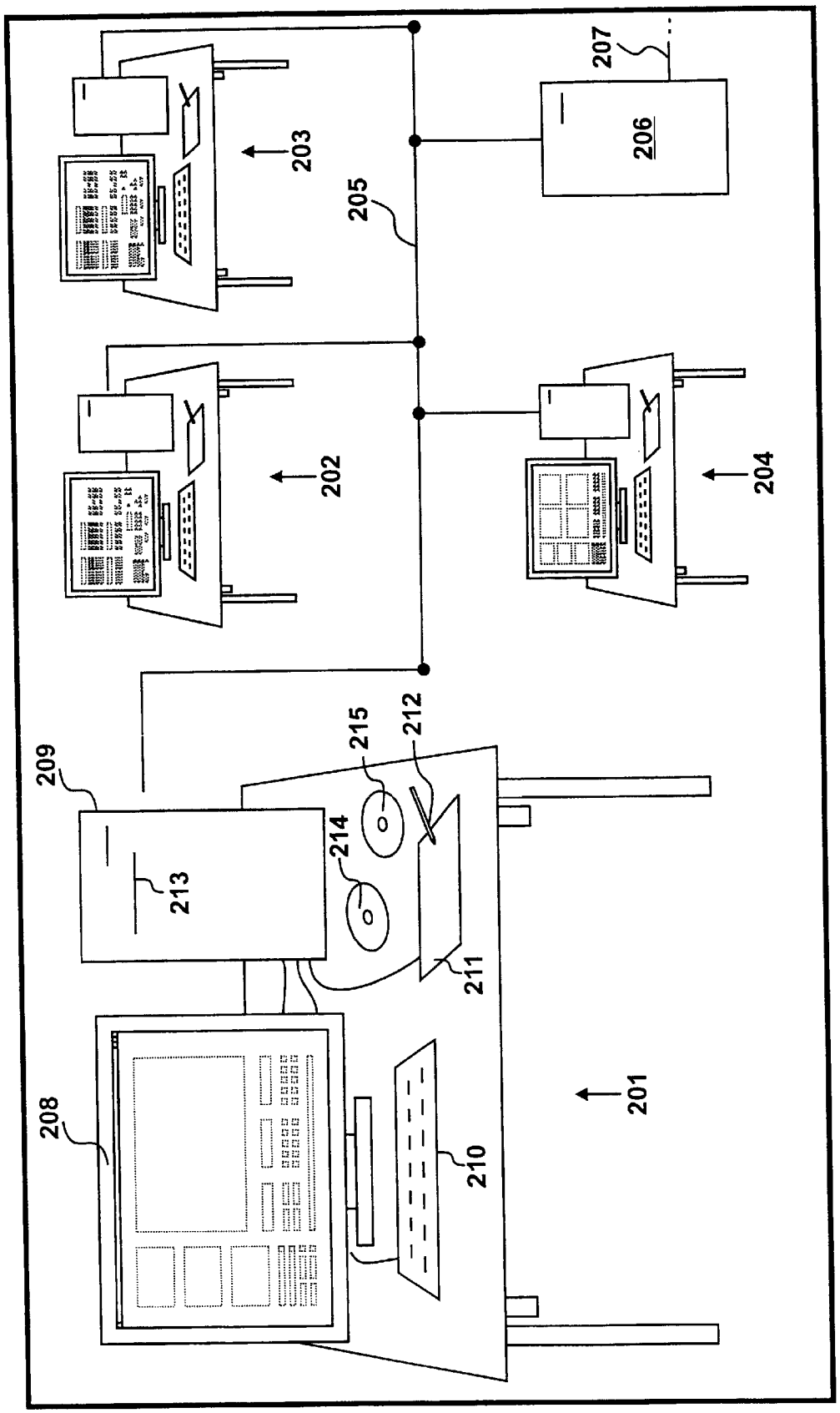
FIG. 2 details the animation design house shown in FIG. 1, including an animation editing workstation including a monitor, a processing system, a CDROM and a CD-R disc.

Equipment present in the animation design house 101 shown in FIG. 1, is detailed in FIG. 2. Several animation editing workstations 201 to 204 are connected to a network 205. A server 206 is also connected to the network 205, and provides facilities for data storage and connection 207 to the Internet. A workstation 201 includes a monitor 208 and a processing system 209. A keyboard 210 and a graphics tablet 211 are connected to the processing system 209. A stylus 212 is used to provide graphical input to the processing system 209 via the graphics tablet 211. The processing system includes a CD-RW (compact disc read-write) drive 213. A CDROM 214 includes data structures defining instructions that, once installed upon the processing system 209, enable a user at the workstation 201 to create and modify animations. A CD-R (recordable compact disc) 215 may be recorded by the user once an animation has been created, and the disc 215 contains a data structure that defines the animation that has been designed.

Several users, at each of the different workstations, may collaborate upon the design of a single animation, or alternatively work on different animations. The server 206 may be used to hold animation data and or instructions centrally, or alternatively, data and or instructions may be stored locally at each workstation, depending upon the nature of each job, and the amount of data that needs to be stored. As an alternative to storing an animation on the CD-R disc 215, such information and or instructions may be transferred to their destination over the Internet, by the connection 207 with the server 206.

In an alternative embodiment, animations are created in-house by design personnel of the broadcasting company. A LAN (local area network) is then used to transfer the relevant data files from the designers to the newsroom and to the graphic department of the TV studio.

Figure 3:
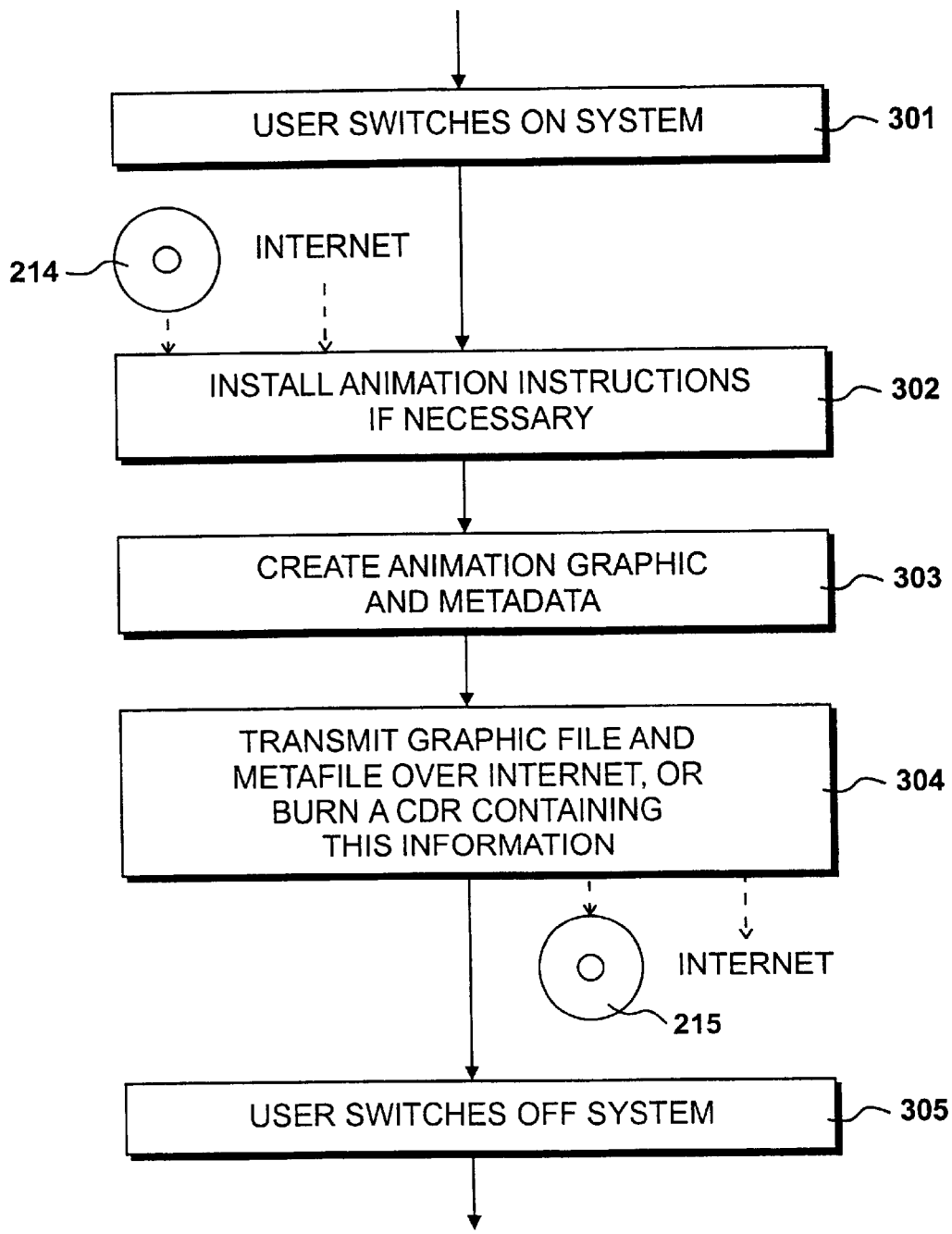
FIG. 3 details workflow performed by a user of the animation editing workstation shown in FIG. 2, including a step of creating an animation, and a step of transferring data.

A summary of the typical workflow performed by the user of the workstation 201 shown in FIG. 2, is shown in FIG. 3. At step 301 the user switches on the processing system 209. At step 302 instructions for creating and or modifying an animation are installed if necessary. The instructions may be supplied on the CDROM disc 214, or downloaded by ftp (file transfer protocol) over the Internet 102. At step 303 an animation graphic file is created by the user, along with metadata which defines how the graphic file can be used. The metadata is stored as a separate file, referred to as a metafile. At step 304 The graphic file and the metafile are transmitted over the Internet to the newsroom 103. Alternatively, a CD-R is created containing a data structure representing these files, and the disc 215 is transmitted physically to the newsroom 103. At step 305 the user switches off the processing system 209.

Figure 4:
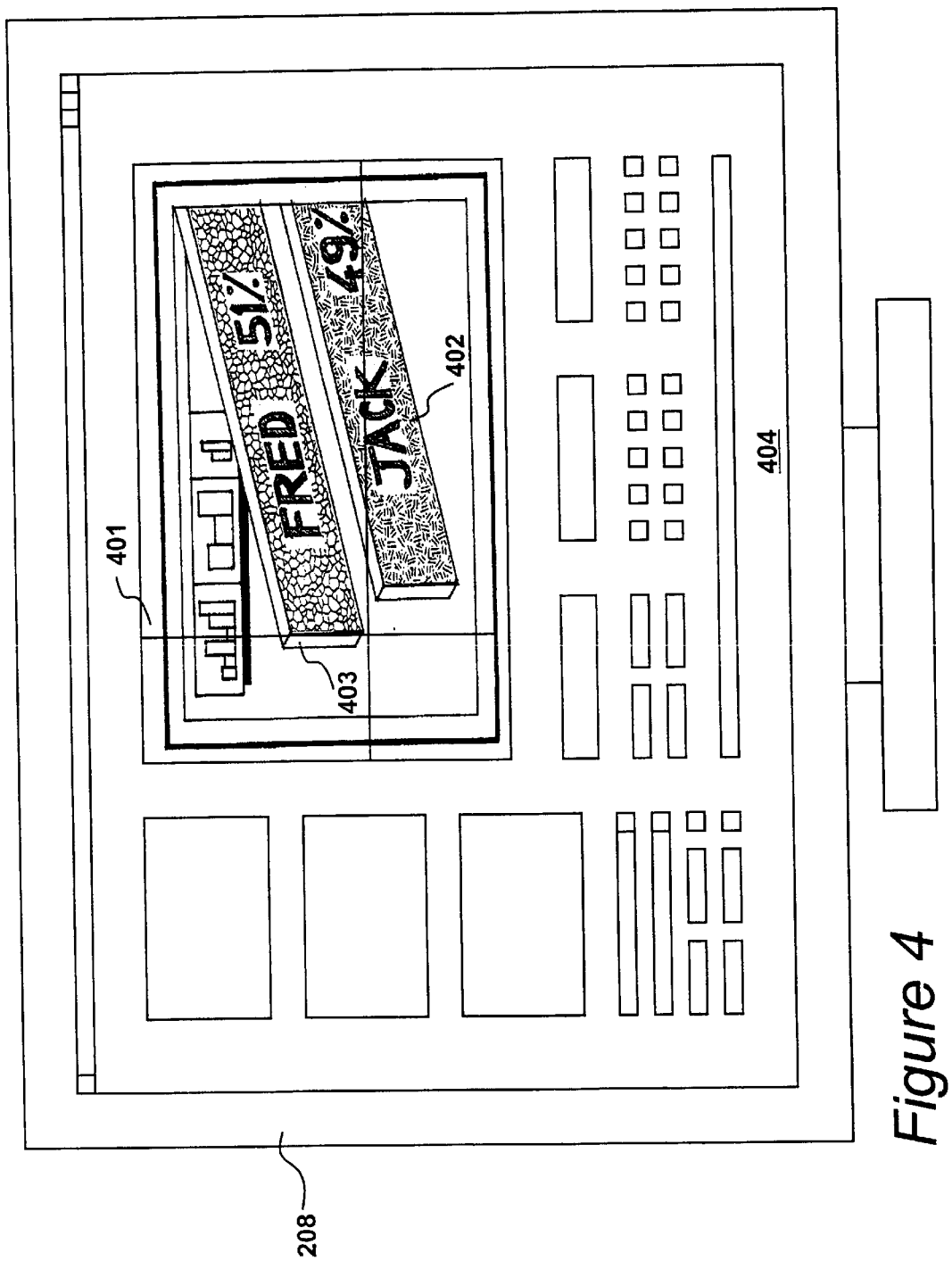
FIG. 4 details a screenshot of the monitor shown in FIG. 2 during the step of creating an animation shown in FIG. 3.

A screenshot of the monitor 208 shown in FIG. 2, during creation of an animation, is shown in FIG. 4. The screen area includes a preview area 401 in which the user may interact graphically with the animation. In the example shown in this Figure, two opposing candidates in a local election have their proportions of votes displayed in the form of a three dimensional bar graph. The animation changes over time, including variations in the view angle of a virtual camera, and the extent of the bars 402 and 403 is configured to grow from zero to the extent determined by results. All these effects are created by the user, from the assembly of primitive objects such as cubes, spheres, text and other shapes. Their characteristics have to be defined not only statically, but also over time. The construction of such animations is a highly skilled and time-intensive process. The cost of generating an animation for a news story is high. In the art, only special events, such as an election, or a widely viewed sports event, can afford to have completely new animations created. A complex user interface 404 enables the user who designs the graphic to set up, modify and control the various components of the animation.

Figure 5:
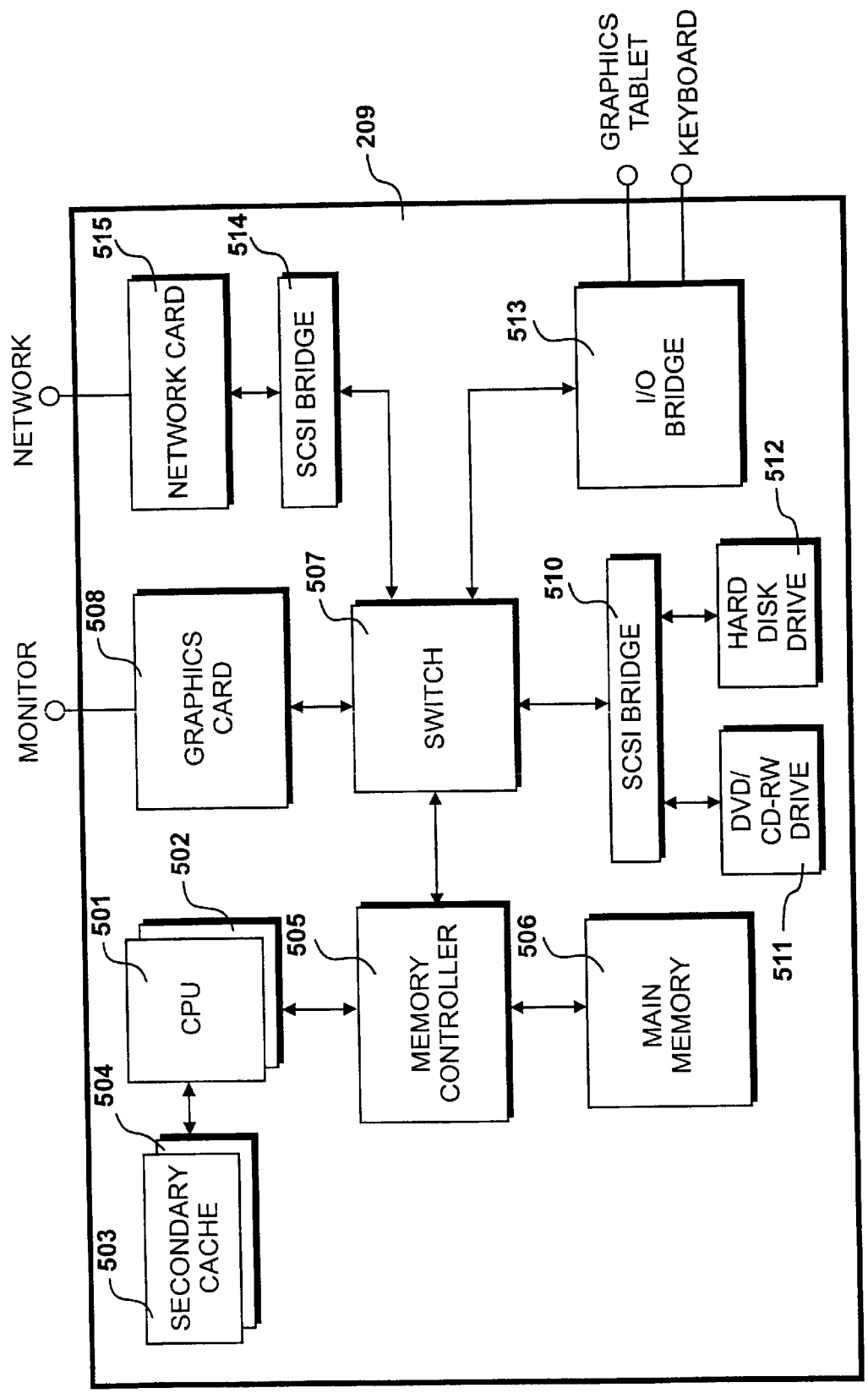
FIG. 5 details hardware components of the processing system shown in FIG. 2, including a main memory.

The main components of the processing system 209 shown in FIG. 2, are detailed in FIG. 5. The processing system 209 is an Octane™ produced by Silicon Graphics Inc. It comprises two central processing units 501 and 502 operating in a symmetrical multi-processing (SMP) configuration. Each of these processors is a MIPS R12000 manufactured by MIPS Technologies Incorporated, of Mountain View, Calif. Each of the processors 501 and 502 has a secondary cache memory 503 and 504 that facilitate per- CPU storage of frequently used instructions and data. Each CPU 501 and 502 further includes separate primary instruction and data cache memory circuits on the processor chip, thereby providing an additional level of processing efficiency. A memory controller 505 provides the connection between the processors 501 and 502 and a main memory 506. The main memory 506 comprises two gigabytes of dynamic RAM.

The memory controller 505 facilitates connectivity between the aforementioned components of the processing system 209 and a high bandwidth non-blocking crossbar switch 507. The switch makes it possible to provide a direct high bandwidth connection between any of several attached components. These include a graphics card 508. The graphics card 508 receives instructions from the processors 501 and 502 to perform various types of graphical image rendering processing, resulting in animated images, and an editing interface for the animation, being rendered on the monitor 208.

A SCSI bridge 510 facilitates connection between the crossbar switch 507 and a DVD/CD-RW drive 511. The DVD/CD-RW drive is used to install instructions for the processing system 102 onto a hard disk drive 512. The DVD/CD-RW drive 511 may also be used to create CD-R discs containing large quantities of instructions and or data. Instructions located on the hard disk drive 512 may be transferred into the main memory 506 for execution by the processors 501 and 502. An input output (I/O) bridge 513 provides an interface to the graphics tablet 211 and the keyboard 210, through which the user interacts with the processing system 209. A second SCSI bridge 514 provides an interface with a network card 515, that provides a network connection between the processing system 209 and the network 205.

In alternative embodiments, the processing system 209 may be an Onyx2, an Octane2 or an O2.

Figure 6:
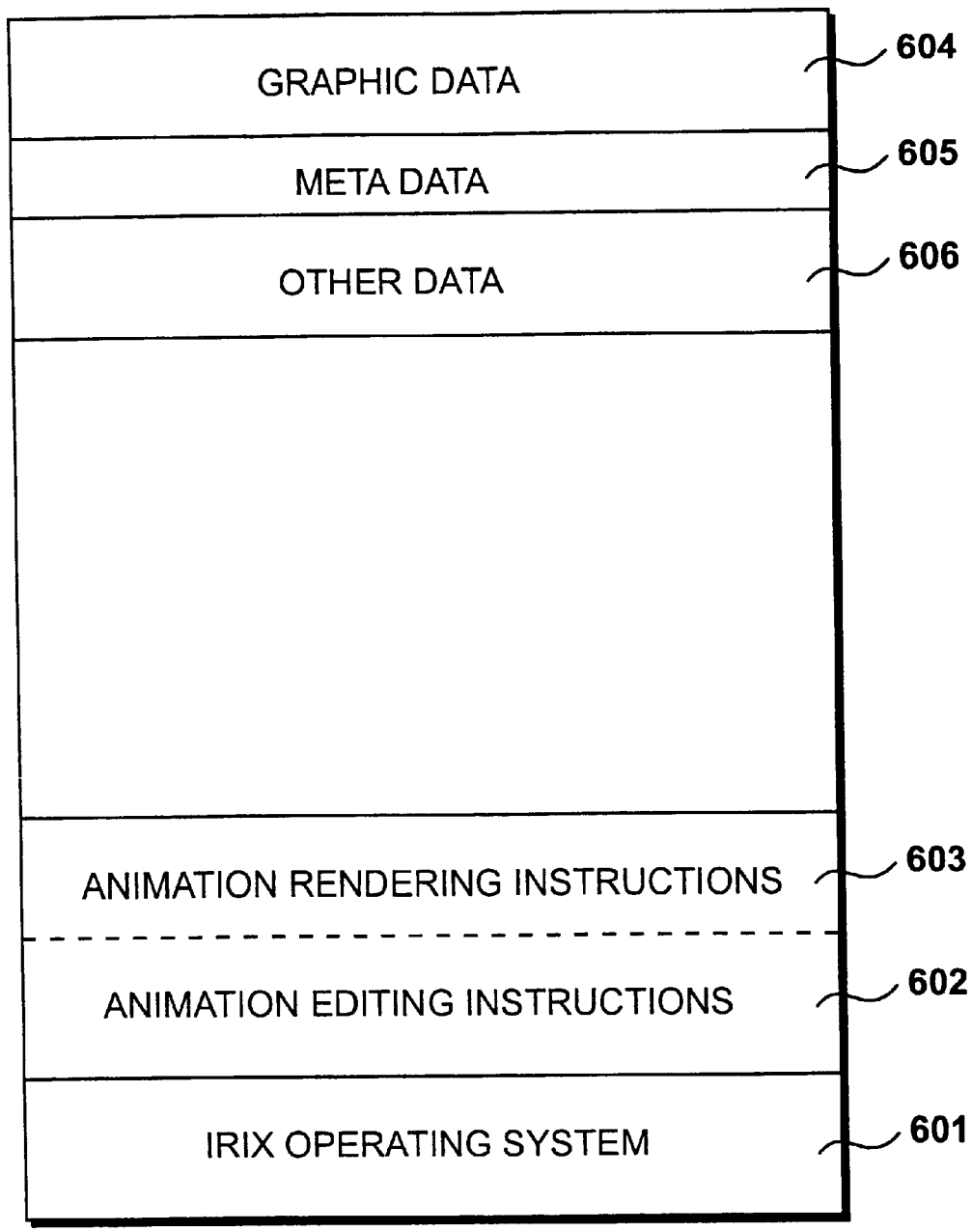
FIG. 6 details contents of the main memory shown in FIG. 5 as they would appear during the step of creating an animation shown in FIG. 3, including metadata, graphic data, animation rendering instructions and animation editing instructions.

The contents of the main memory 506 shown in FIG. 5, as they would appear during step 303 in FIG. 3, are detailed in FIG. 6. An operating system 601 provides common system functionality for application instructions running on the processing system 501. The operating system 601 is the Irix™ operating system, available from Silicon Graphics Inc. Animation editing instructions 602 and animation rendering instructions 603 are instructions required for generating an animation. The rendering instructions 603 are required to preview the results of editing operations carried out by the user. Graphic data 604 includes data defining the animation in terms of its basic ingredients, including object primitives and their geometrical attributes, that are created by the animation artist working at the workstation 201. Metadata 605 includes information for selected characteristics of an animation. Other data 606, includes data required for the operating system 601, and other instructions 602 and 603.

Figure 7:
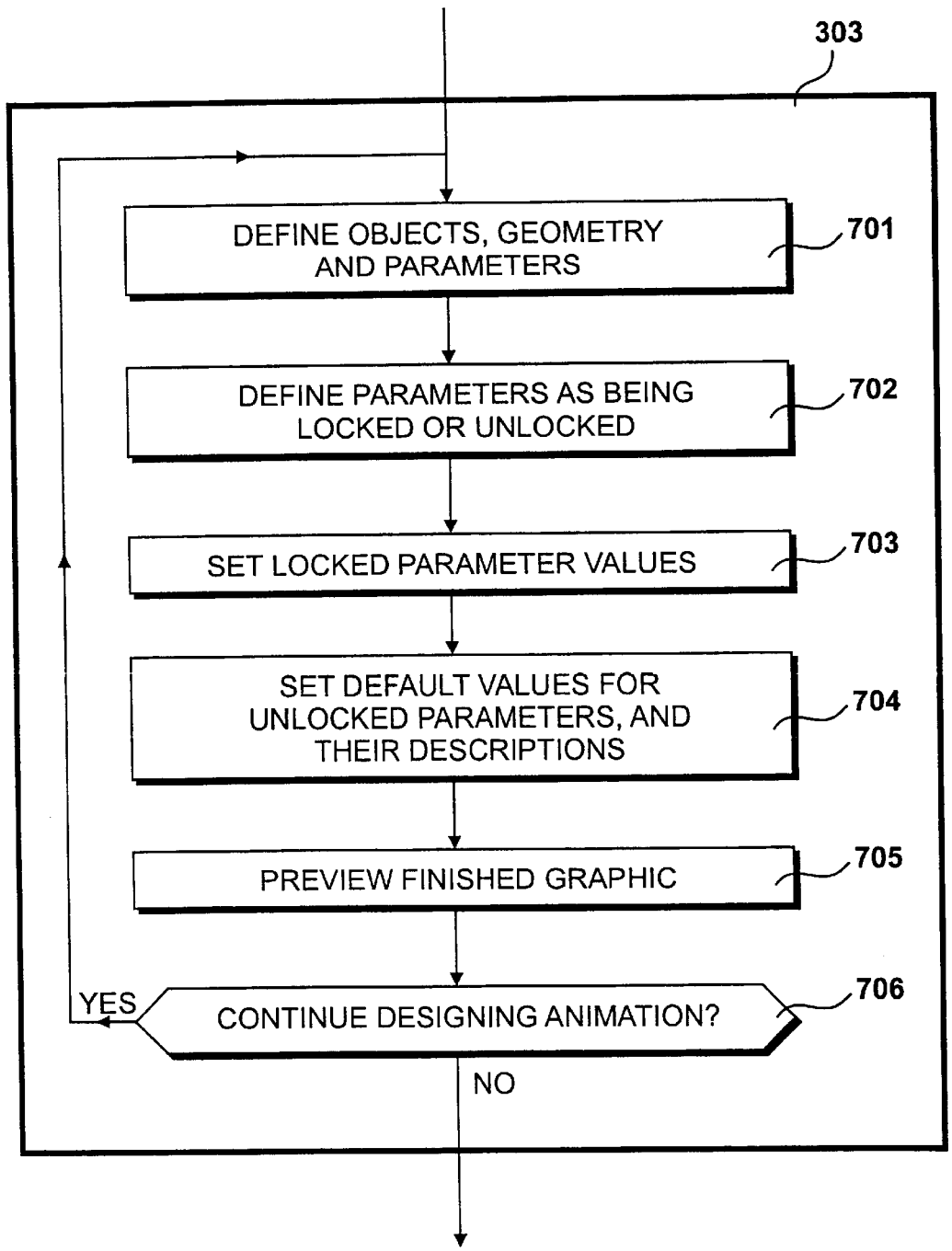
FIG. 7 details the step of creating an animation shown in FIG. 3 in accordance with the instructions for editing an animation shown in FIG. 6 and which originated from the CDROM shown in FIG. 3.

Creating an animation graphic and metadata, as performed at step 303 in FIG. 3, is detailed in FIG. 7. At step 701 the user defines objects, geometry and parameters for the animation. Such manipulations are performed using the user-interface shown in FIG. 4, in combination with operations of the keyboard 210 and or graphics tablet 211. At step 702 the user categorises parameters as being locked or unlocked. At step 703 the user sets the values for locked parameters. At step 704 the user sets values, including default values, for unlocked parameters. Also, the user defines a description for each of the unlocked parameters. At step 705 the finished graphic is previewed. At step 706, a question is asked as to whether to continue with animation design. If so, control is directed to step 701. Alternatively, this completes the steps performed during creation of an animation.

The steps of FIG. 7 are descriptive of the operations performed by a user. However, their order is arbitrary, and in practice, the order in which these steps are taken is random due to the way in which a graphical user interface operates. Each of the described operations in the steps may be performed separately, in combination with, and in any order, with respect to any of the other described operations. Steps 701 to 706 are intended to delineate operations which require specific reference.

Figure 8:
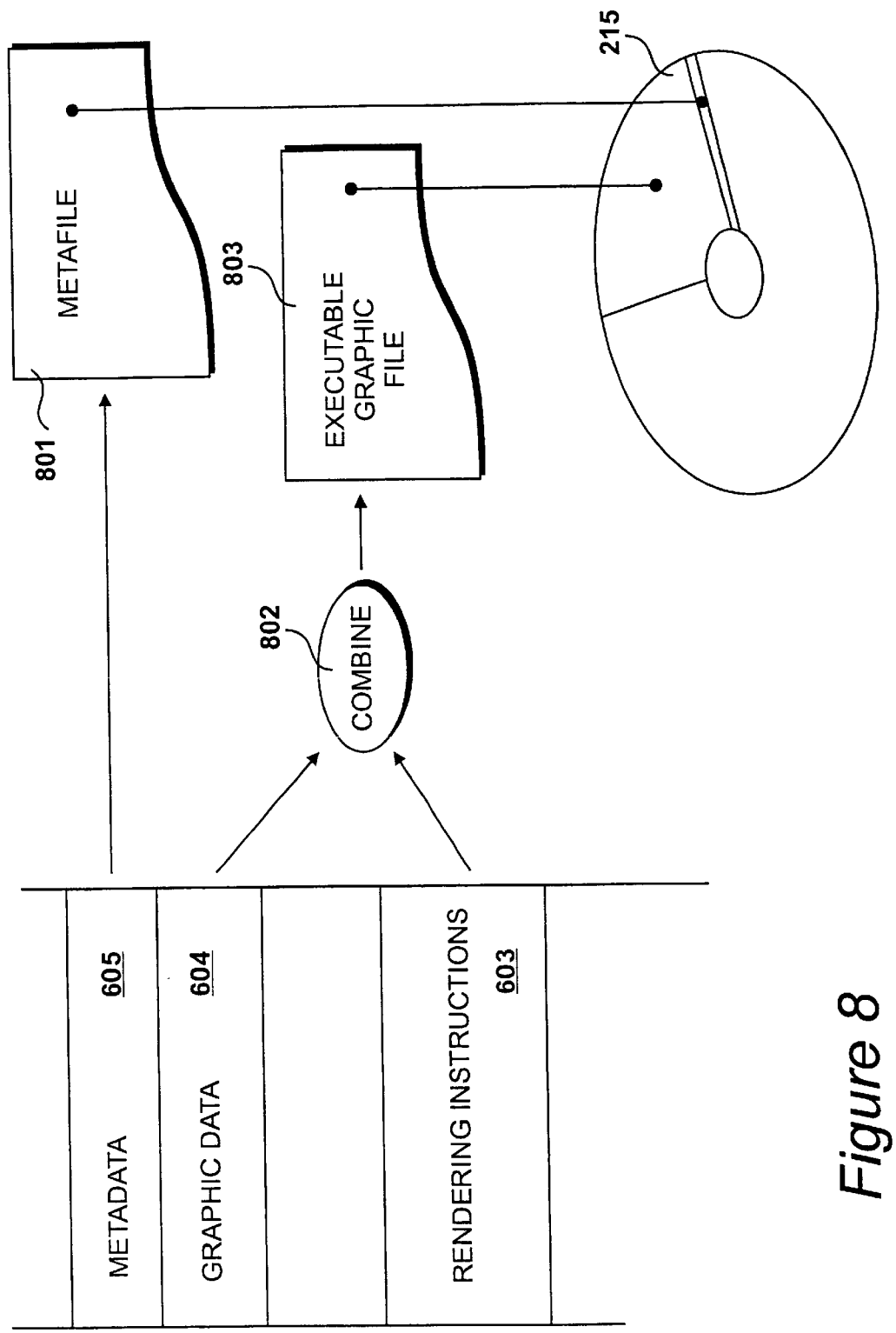
FIG. 8 details the step of transferring data shown in FIG. 3.

The transmission of a graphic file and a metafile, shown at step 304 in FIG. 3, is illustrated in FIG. 8. Metadata 605 is supplied as a metafile 801, for inclusion on the CD-R disc 215. The metadata includes descriptions, default values, value fields and actual values of unlocked parameters, in accordance with operations performed at step 704 in FIG. 7.

Graphic data 604 defines first characteristics of an animation. The first characteristics are the most complex, and are appropriate for a first level of user access, such as access by an animation designer working in the animation design house 101. The graphic data 604, defining most of the components of an animation, may be combined 802 with rendering instructions 603, to generate an executable graphic file 803. The executable graphic file is stored on the CD-R disc 215. These data structures may also or alternatively be transmitted over a network 205, and or over the Internet 102.

The metadata 605 is stored in the metafile 801 in XML (extensible mark-up language). An example of a metafile is shown in FIG. 9 and continued in FIG. 10. Each line has a line number, which is provided for reference purposes only. At lines 901 and 902 the data format is defined. In the preferred embodiment, metadata is known alternatively as page data, and this is reflected in some of the contents of line 902. Lines 904 and 905 are a single XML statement defining the page name, or the identity of the metadata. Within this line is the text: graphicName="dave_scene". This refers to the name of the graphic data 604 contained within the graphic file 803. Line 904, therefore, contains an instantiation of the animation defined in the graphic. Unlocked parameters in the metadata may be adjusted in accordance with the requirements of a specific news story.

At line 906 a reference ID number is defined. This associates the following XML lines with a specific parameter link that is contained within the graphic data 604. In this way the locked parameters in the graphic data may be combined with unlocked parameters in the metadata to fully define the appearance and characteristics of the resulting animation. Lines 907 to 914 complete the definition of a single unlocked parameter. The value is defined in the value field at line 907. The type of parameter and its default value are defined at line 908. The parameter's permissible range is defined at lines 909 and 910, in this case, in the form of a maximum and minimum value for a floating point number. At line 913, the parameter's description is provided.

The contents of lines 907 to 913 are defined initially by the user of the workstation 201, who is responsible for the detailed design of the graphic, and the parameter's value, shown at line 907, is therefore modifiable at a first level of user access. However, the parameter's value, may be changed by anyone who has access to the metafile 801. This is considered as providing a second level of user access. The information provided in lines 908 to 913 provides subsequent users with enough information to sensibly select different values of the parameter, without necessarily having full and detailed knowledge of characteristics encoded in the graphic data 604. In particular, the metadata includes a value field at line 907 allowing the parameter's value to be edited, and a description at line 913 which provides a means of identifying the parameter to the user. In addition, the default value at line 908, provides a suitable alternative for the parameter's value at line 907, even when the user might have no idea what effect this value has on the appearance of the resulting animation. The designer of the graphic carefully chooses default values, so that subsequent users of the system can receive useful information as to what kind of values are suitable for the value field at line 907. In this respect, the designer of the animation designs how its user interface operates, and can guide the method and ways in which the animation can be most advantageously operated.

A similar parameter definition is provided at lines 915 to 923. The metafile continues in FIG. 10. A third parameter is defined at lines 924 to 932. In this case, the parameter is a string of characters. Again, a default value is provided. The permissible range for a string of characters is here defined in terms of its maximum length, as shown at line 927. At line 928, certain characters are defined as being invalid for the string. Lines 927 and 928 may be considered as defining a range of permissible characteristics for the parameter. A fourth parameter is defined at lines 933 to 945. In this case, the parameter is defined as having one of several preset values. These preset values are defined in lines 936 to 941. This type of parameter is known as an enumerated type, as indicated at line 935, along with a default value. The instantiation of graphic data is completed by the end-of-page tag at line 946.

Metadata typically consists of many dozens of such parameter definitions. Each such definition provides the user with a means for accessing a characteristic of the resulting animation. Parameters that are defined in this way are known as unlocked parameters, whereas locked parameters are defined as part of the graphic data 604. Unlocked parameters are accessible at a second level of user access, as well as at a first level of user access, whereas locked parameters are accessible only at a first level of user access.

Figure 11:
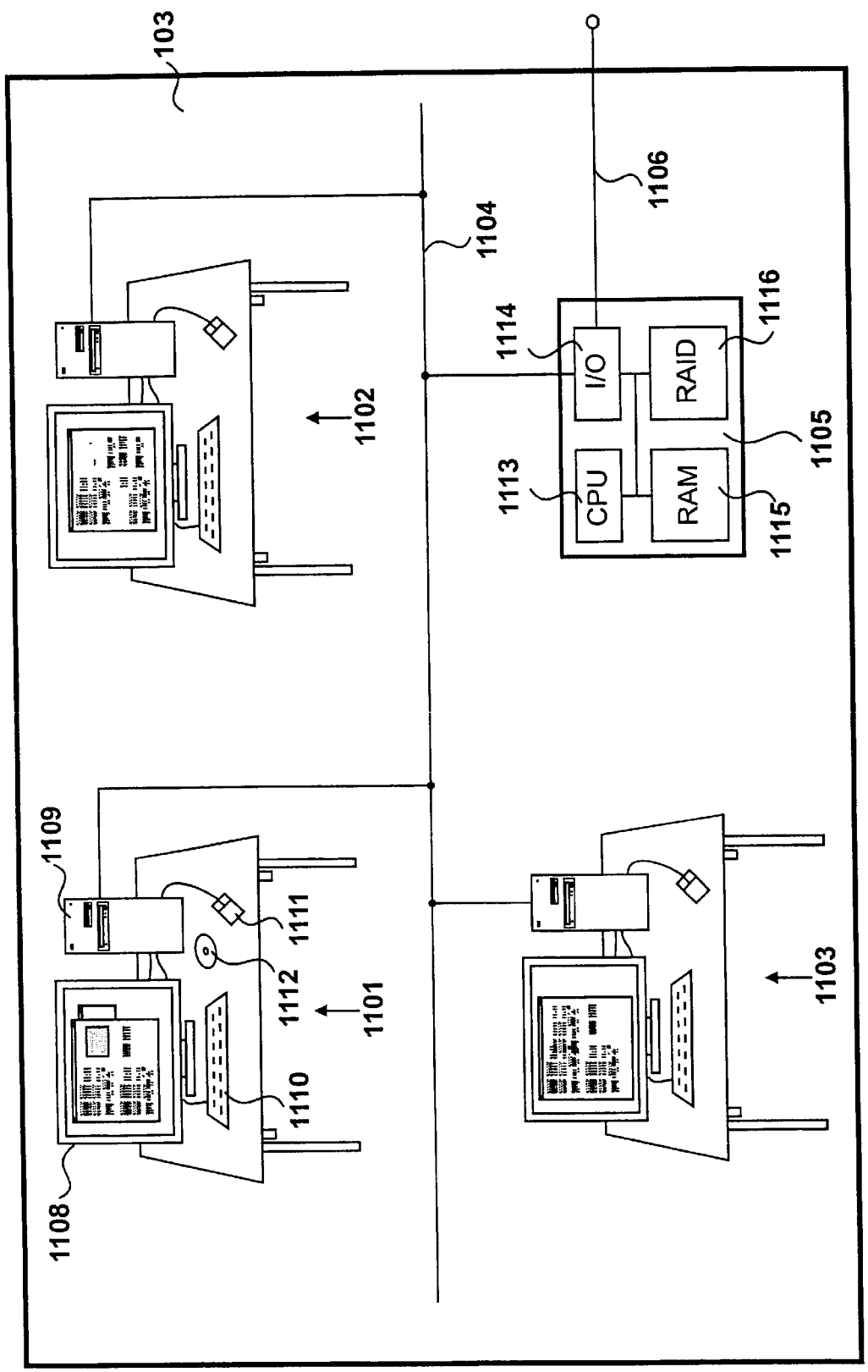
FIG. 11 details the newsroom shown in FIG. 1, including a news editing workstation comprising a monitor and a processing system, a server and several other news editing workstations connected together via a network.

The newsroom 103 shown in FIG. 1 is detailed in FIG. 11. Equipment in the newsroom includes three news editing workstations 1101, 1102 and 1103. These are connected to a network 1104. A server 1105 provides central file storage facilities, and also provides a connection 1106 to the Internet 102. The first news editing workstation 1101 includes a monitor 1108, a processing system 1109, a keyboard 1110 and a mouse 1111. A CDROM 1112 contains instructions for editing metadata 605, which are installed on the processing system 1109. The server comprises a CPU 1113, input output circuitry 1114, random access memory 1115 and a redundant array of inexpensive disks (RAID) 1116, upon which news data, including metafiles, can be centrally stored.

Figure 12:
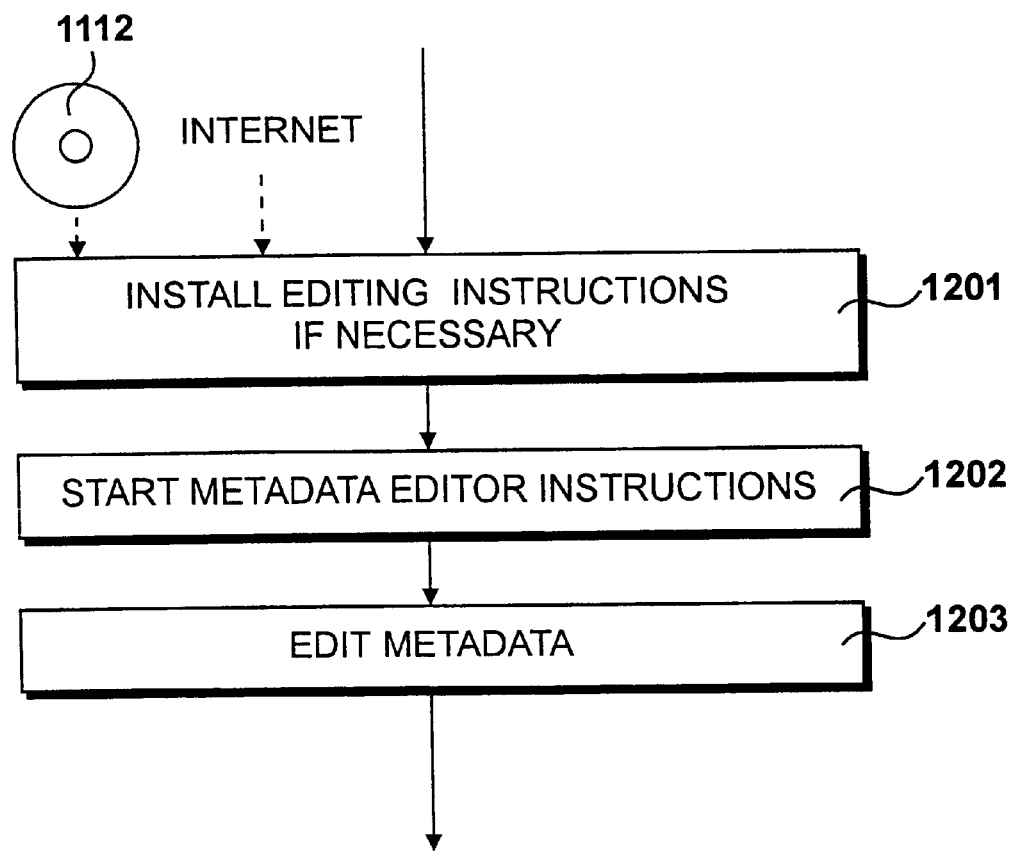
FIG. 12 details the workflow of a user operating the news editing workstation shown in FIG. 11, including a step of editing metadata.

The workflow of a user situated at the first news editing work station 1101 in FIG. 11 is summarised in FIG. 12. At step 1201 metadata editing instructions are installed if necessary. Installation may be from the CDROM 1112, or by download across the Internet. At step 1202 the metadata editor instructions are started, and at step 1203, the user edits the metadata.

Figure 13:
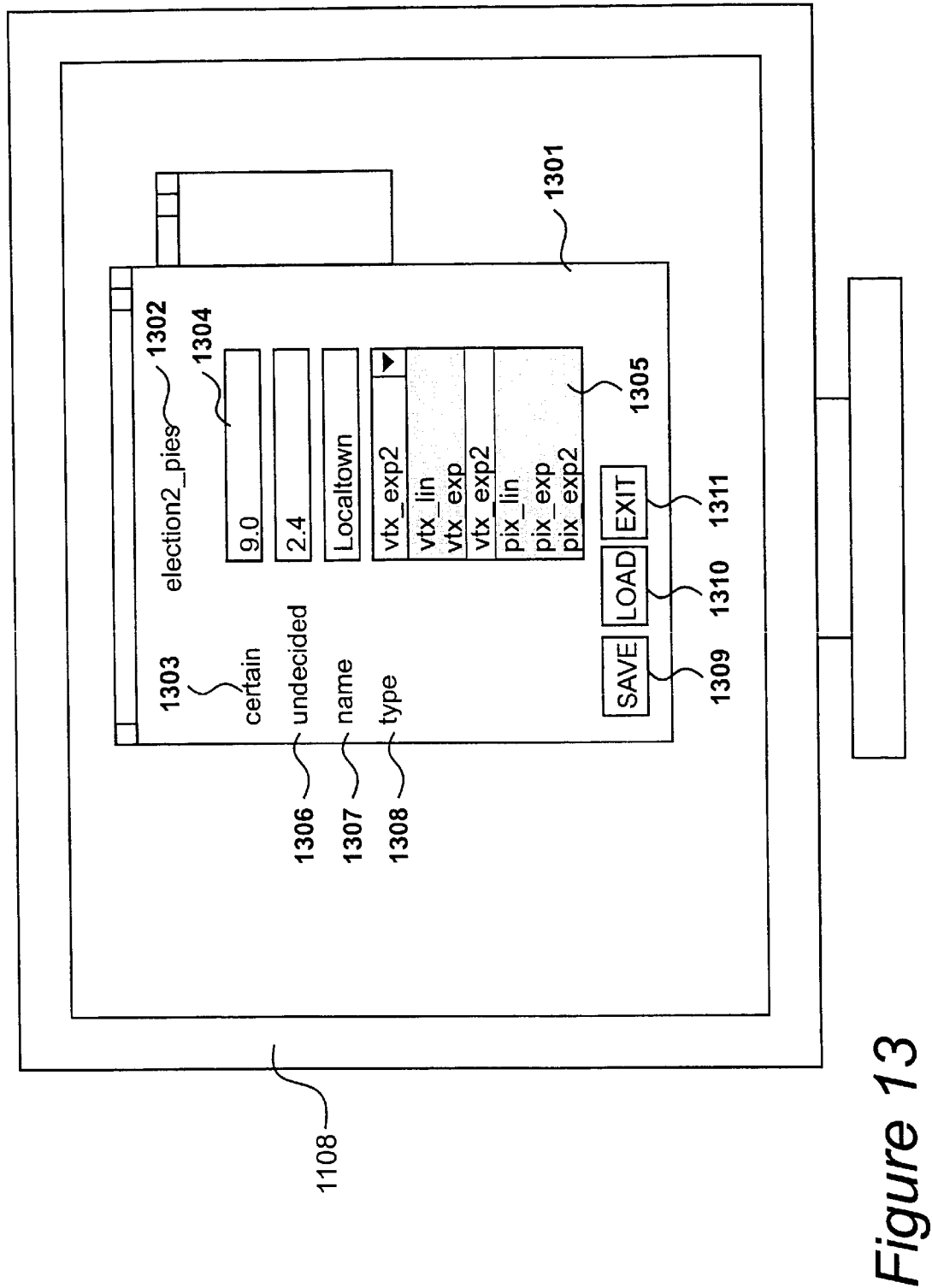
FIG. 13 shows a screenshot of the monitor shown in FIG. 11 during the step of editing metadata shown in FIG. 12.

A screenshot of the monitor 1108 shown in FIG. 11 during editing, is shown in FIG. 13. The editor creates a window 1301 in which are defined fields for each parameter. The editing window 1301 has a title 1302. Each parameter has a description field and an editable value field 1304. The title 1302, description 1303 and value 1304 are each generated from data in the metafile 801. While editing a value field, the user may, with appropriate interactions with the graphical user interface, discover the default value recommended for an unlocked parameter by the designer of the animation, for example by right-clicking on the mouse while the cursor is located over a parameter description. Where a preset value must be selected, the interface provides a drop-down menu, as indicated at 1305, from which the user can select an appropriate value for the unlocked parameter.

Four parameters 1303, 1306, 1307 and 1308 are shown in FIG. 13. These correspond to the four parameters defined in the XML data structure shown in FIGS. 9 and 10. The user may set new values using the interface. The new parameter settings may be saved by activating a SAVE button 1309. Another page of XML may be edited using a LOAD button 1310, and the edit window 1301 may be closed by activating an EXIT button 1311.

Figure 14:
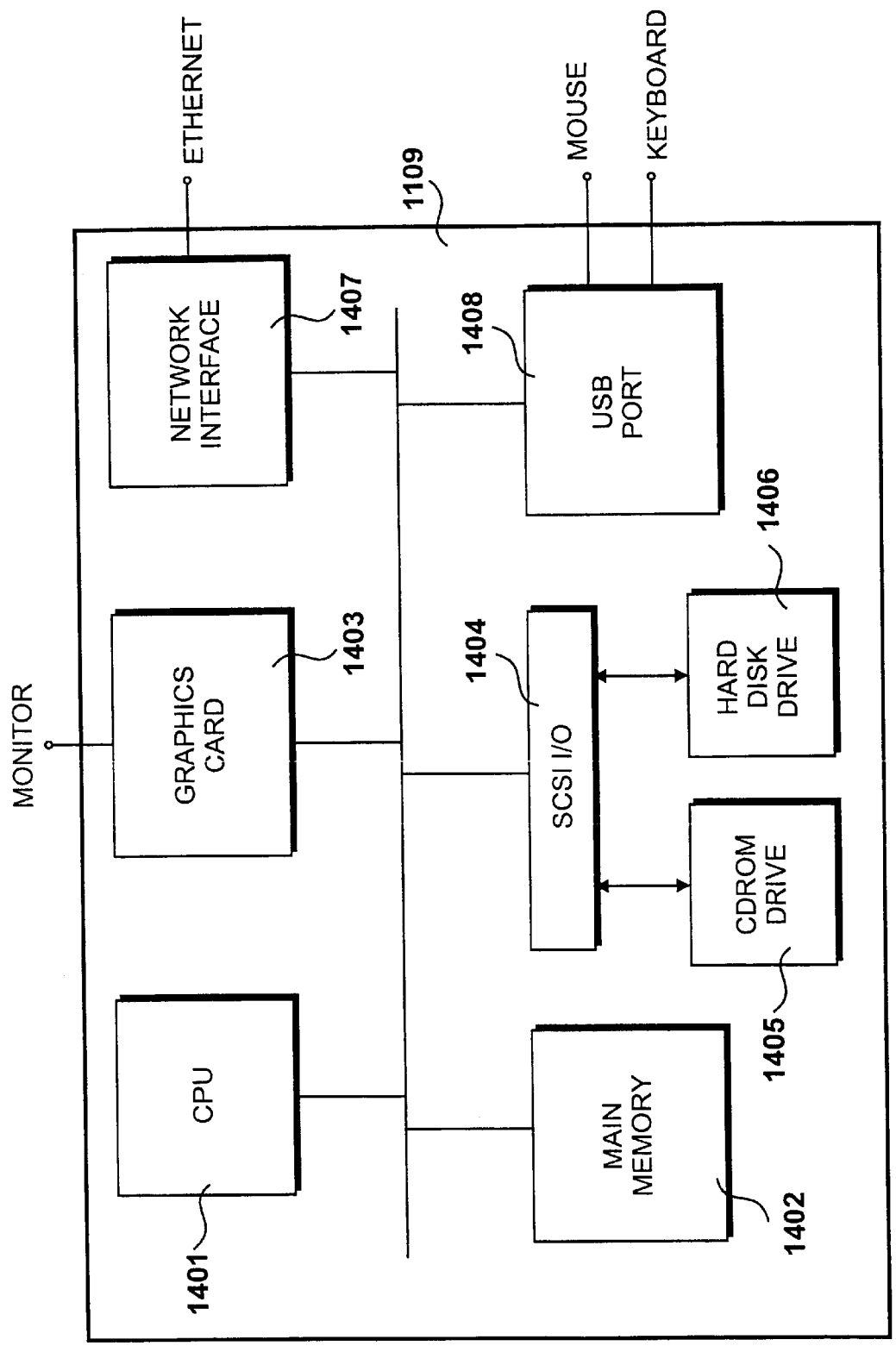
FIG. 14 details the processing system shown in FIG. 11, including a main memory.

The processing system 1109, used in the news editing workstation 1101 shown in FIG. 11, is detailed in FIG. 14. The processing system is a Power Mac G4, available from Apple Computer Inc. The central processing unit 1401 is a G4, running at 533 MHz, details available from Motorola Inc. The CPU 1401 includes on chip primary instruction and data caches, and an off-chip secondary cache. The CPU 1401 is connected to a main memory 1402, in which are stored data, and instructions that are executable on the CPU 1401. A graphics card 1403 receives graphics commands from the CPU 1401 to render the window-based graphical user interface 1301. A SCSI input output (I/O) interface 1404 provides efficient communication with storage devices 1405 and 1406. These storage devices are a CDROM drive 1405 and a nine gigabyte hard disk drive 1406. A network interface 1407 provides the connection to the newsroom Ethernet network 1104. A Universal Serial Bus (USB) port 1408 provides connections to the keyboard 1110 and the mouse 1111.

In an alternative embodiment the processing system 1109 is a personal computer (PC) having an Intel Pentium™ processor.

Figure 15:
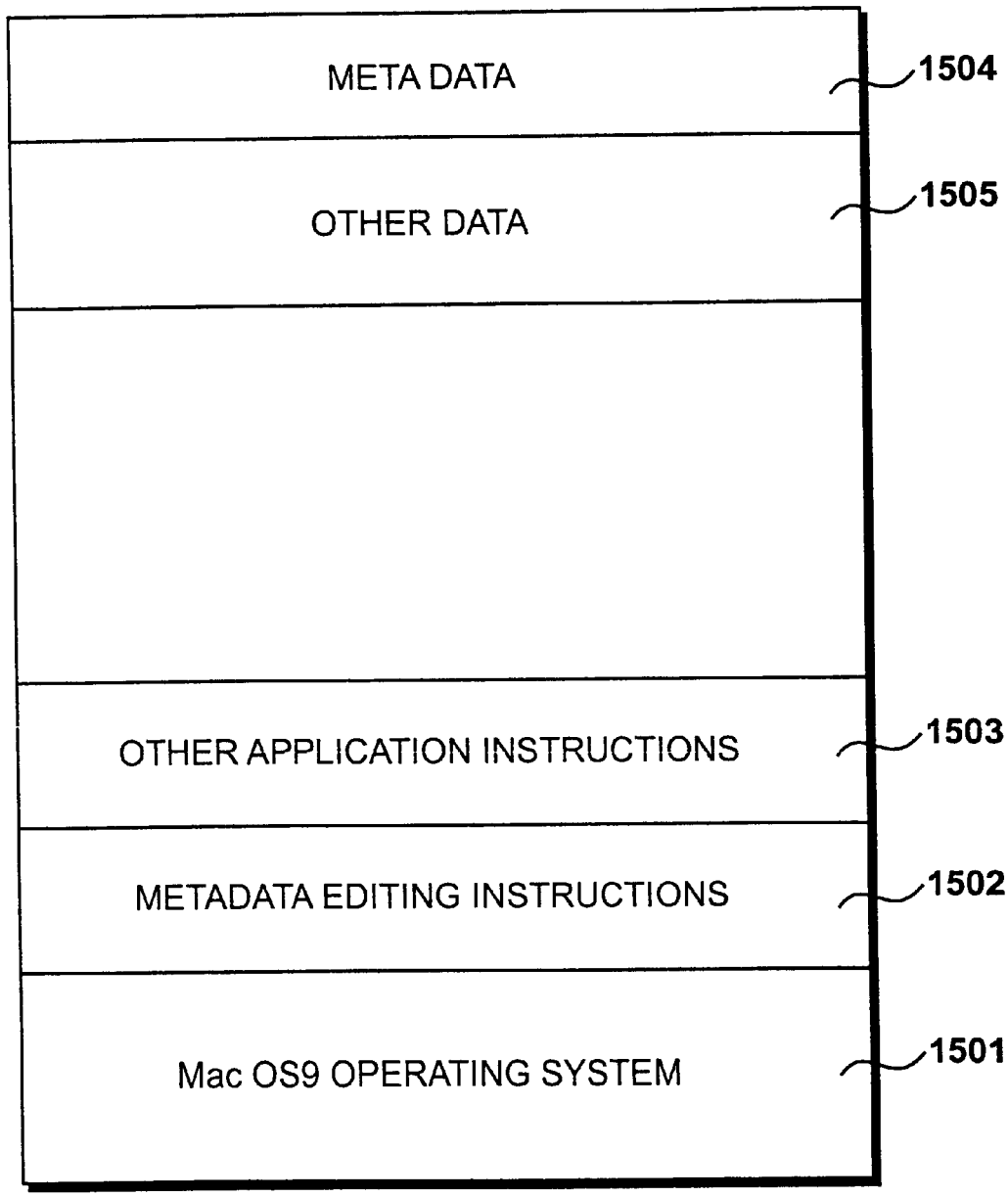
FIG. 15 details the contents of the main memory shown in FIG. 14.

The main memory 1402 shown in FIG. 14, is detailed in FIG. 15. A MacOS9™ operating system 1501 provides common application processing functions, including interfacing instructions for the USB port 1408, the network interface 1407, and other peripherals. Metadata editing instructions 1502 include instructions for the editing interface shown in FIG. 13. Other application instructions 1503 include other applications and resident utilities such as those commonly provided in a processing system of this type. Metadata 1504 includes the XML data 605 shown in FIGS. 9 and 10. Other data 1505 includes data required for the correct operation of the instructions 1501,1502 and 1503.

Figure 16:
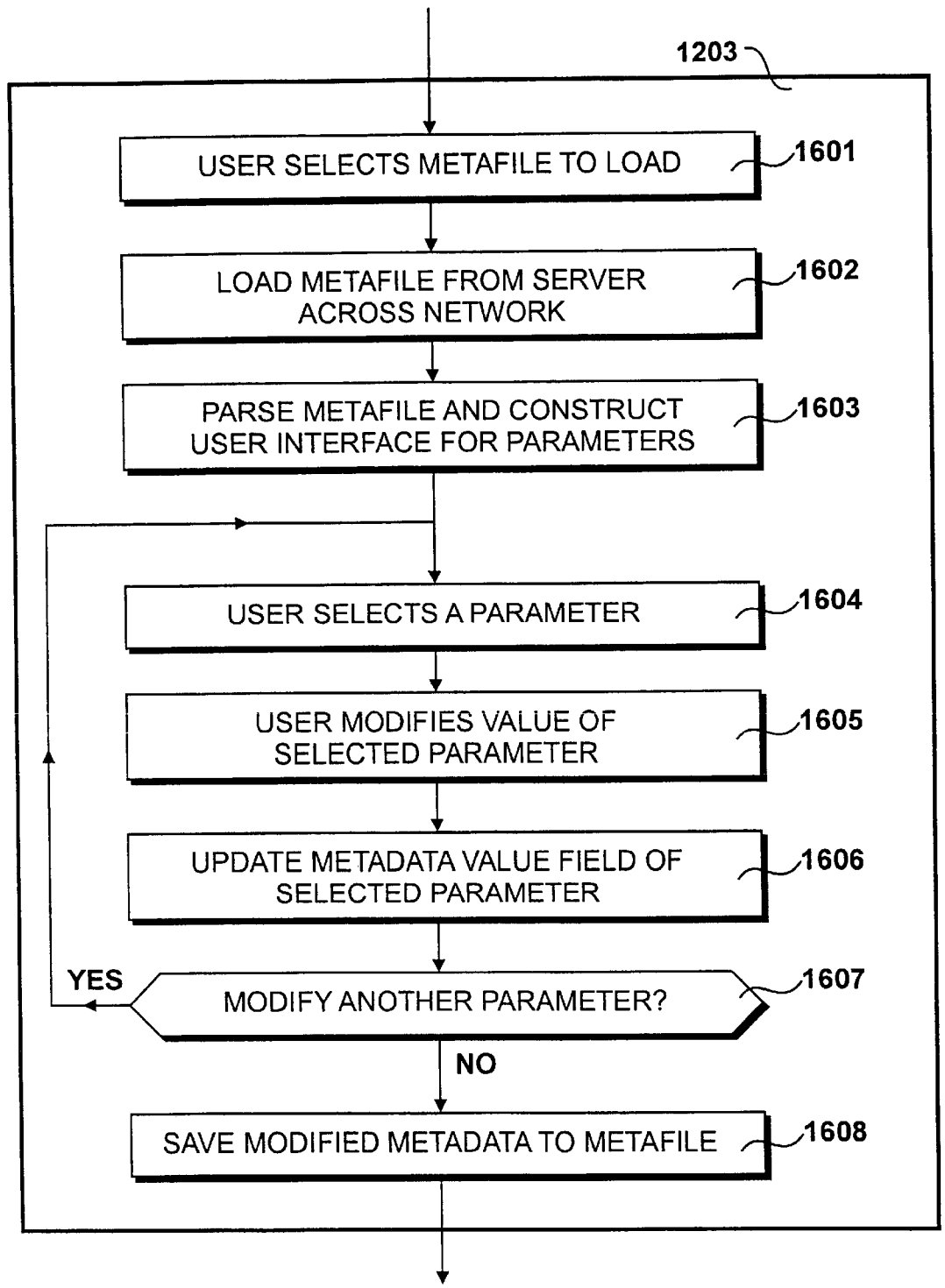
FIG. 16 details the step of editing metadata shown in FIG. 12, including steps of loading a metafile and saving a metafile.

The step of editing metadata, shown at 1203 in FIG. 12, is detailed in FIG. 16. At step 1601 the user selects a metafile for loading. At step 1602 the metafile 801 is loaded, via the network 1104, from the RAID 1116 in the server 1105. At step 1603 the metafile is parsed, and a user interface, as shown in FIG. 13, is constructed for the unlocked parameters. Steps 1604 to 1607 represent actions performed by the user while editing using the interface shown in FIG. 13. At step 1604 the user selects a parameter, for example, by clicking on its value 1304. At step 1605 the user enters a new value for the selected parameter, either by typing one in, selecting the default, or by dragging with the mouse 1111 through a list of preset values 1305. At step 1606, the value field 907, 916, 925 or 934 is updated in the metadata. At step 1607 a question is asked as to whether the user wishes to edit another unlocked parameter. If so, control is directed to step 1604. Alternatively, control is directed to step 1608, where modified metadata 605 is saved in response to the user activating the SAVE button 1309.

Figure 17:
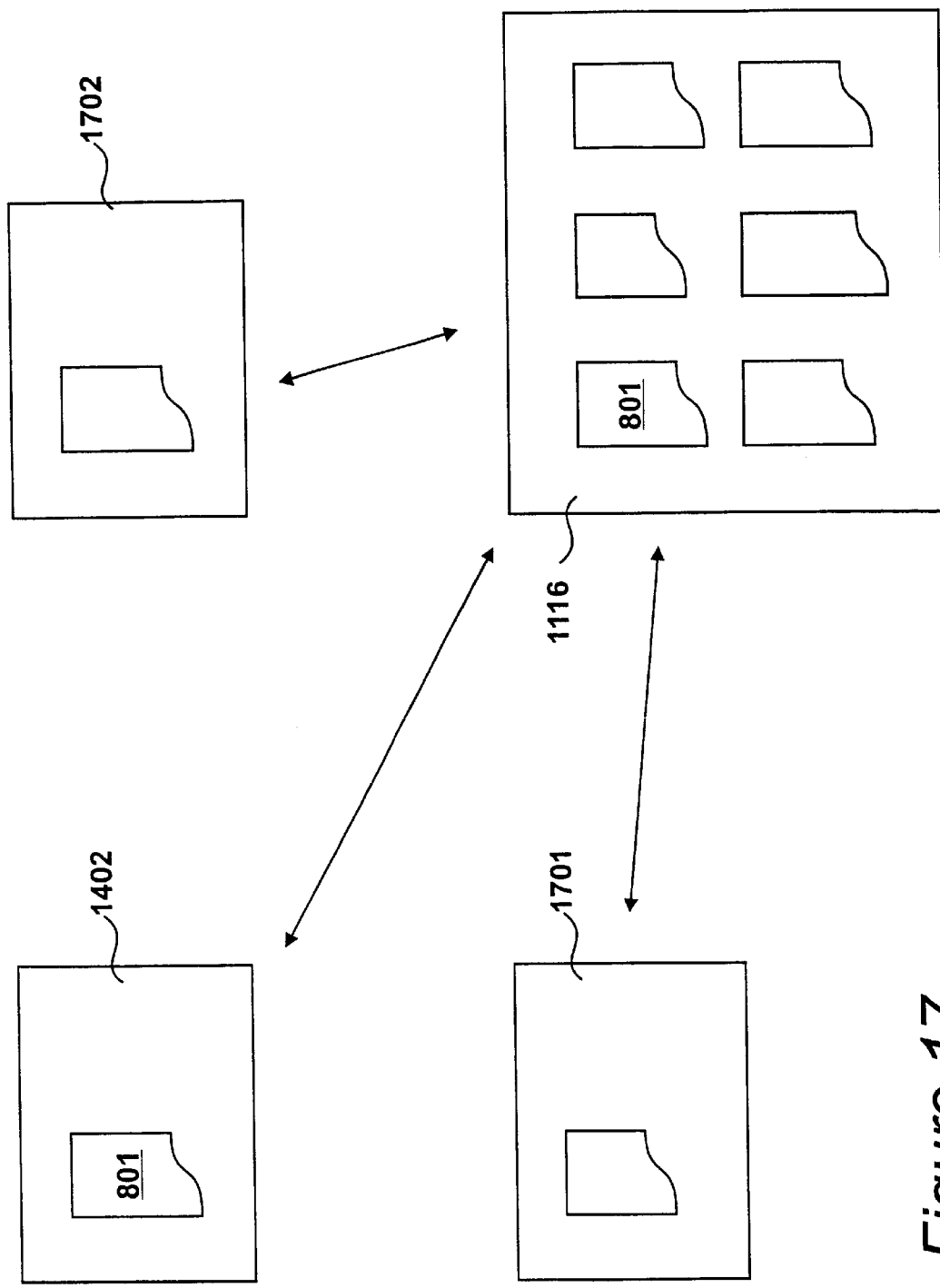
FIG. 17 illustrates the effect of the several workstations shown in FIG. 12 loading and saving several metafiles.

Newsroom activities are summarised in FIG. 17. Several news stories are being edited for a news program. Metafile 801 is being used for just one such story. It is loaded from the server's RAID 1116 across the network to the first workstation's memory 1402. There it is modified in accordance with a particular series of facts that are to be displayed as part of an animated graphic for the news program. Several other stories are provided with graphics in this way. The same graphic data 604 may be instantiated several times over several days, as a particular news story develops, but with slight variations each time it is put on air. Other news stories evolve similarly. Different metafiles and possibly different graphic data are used for these. However, the newsroom only needs access to the metafiles, as these contain the unlocked data that is to be modified by an editor or journalist. The main memories 1701 and 1702 of other computers also contain metafiles, which are loaded and saved to and from the server's RAID 1116. In this way, the newsroom quickly and efficiently maintains an up-to-date sequence of news stories, and their animations, by simple editing using an interface of the type shown in FIG. 13.

A metafile 801 is typically several kilobytes in size. This size of file is suitable for easy transfer over the Internet, and so remotely connected computers 106 and 107 can be used to edit metadata for a news story. In addition to writing an article, a journalist can also transfer a modified metafile back to the newsroom server 1105, where other aspects of the story can be updated by a news editor, or left unchanged. Graphic data 604, by contrast, is extremely large, and typically is many megabytes in size. Furthermore, the graphic data can only be edited upon a powerful image processing workstation of the type shown in FIG. 2, and requires a different set of skills to do so.

The metadata 605 is encoded in such a way as to enable construction of a user interface, within which a user may modify values, or have value hints supplied to them, in the form of default parameter values. By linking the unlocked parameter values with parameter characteristics, in the same file, a user is provided, not only with parameter access, but also with information about parameters, such as their description, and a default value. The use of the XML open format, ensures that simple editing instructions can be created for a variety of processing environments. For example, an editor can be encoded as an ActiveX™ object for a Windows™ operating system.

The designer of the graphic can determine what level of customisation the end user has access to. By selecting which parameters are locked, or left unlocked, the designer can ensure that end users are able to control as much of the animation as is appropriate to their needs, and not more. By restricting the interface possibilities in this way, the process of setting up an animation for a specific TV broadcast becomes greatly simplified. The editor, journalist or program maker, can concentrate on relevant characteristics, rather than being confronted with an enormous amount of information that is irrelevant for the finalisation of a television production.

Figure 18:
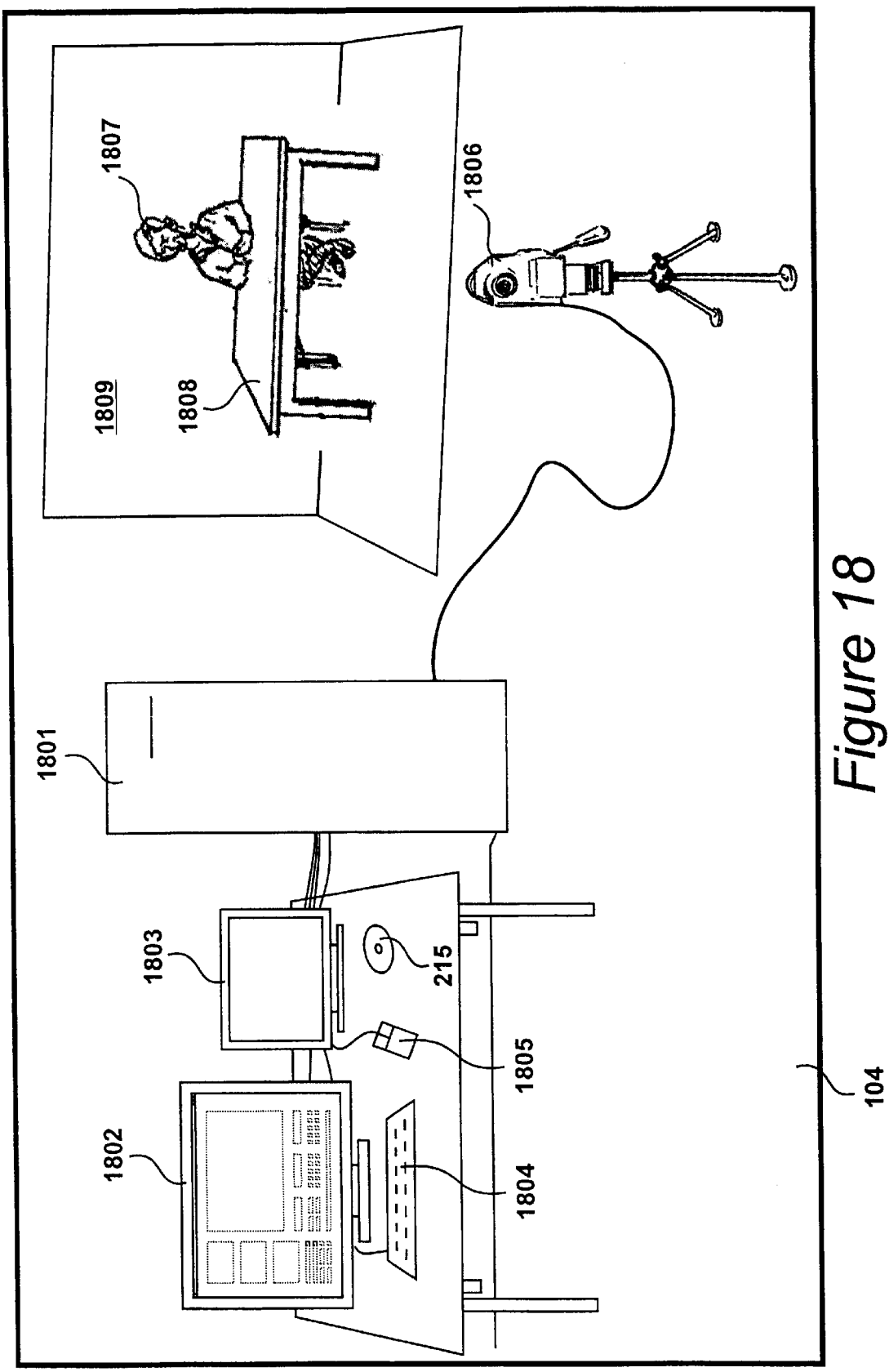
FIG. 18 details the television studio shown in FIG. 1, including an animation rendering workstation comprising a display monitor, a broadcast monitor and a processing system.

Once metadata 605 has been generated for a news story, it is supplied to the television studio 104 for use in a broadcast. The television studio 104 shown in FIG. 1 is illustrated in FIG. 18. A graphical rendering system comprises a processing system 1801, a monitor 1802, a broadcast monitor 1803, a keyboard 1804 and a mouse 1805. The processing system 1801 receives signals from a video camera 1806. A newsreader 1807 is located at a desk 1808 in front of a blue screen backdrop 1809. The processing system substitutes blue portions of the camera image with an artificial background. Background or foreground portions of the camera's image may be substituted for digitally generated image contents from an animation. During the news broadcast, an operator manually provides cues to the processing system 1801 via the keyboard 1804, in order to trigger the start of each new animation sequence as it is required for its associated news story. Alternatively, automatic cues may be provided via a studio network. Instructions for rendering an animation are loaded from the CD-R disc 215. Metadata on this disk is not usually used. Metadata is received instead, from the newsroom 103.

Figure 19:
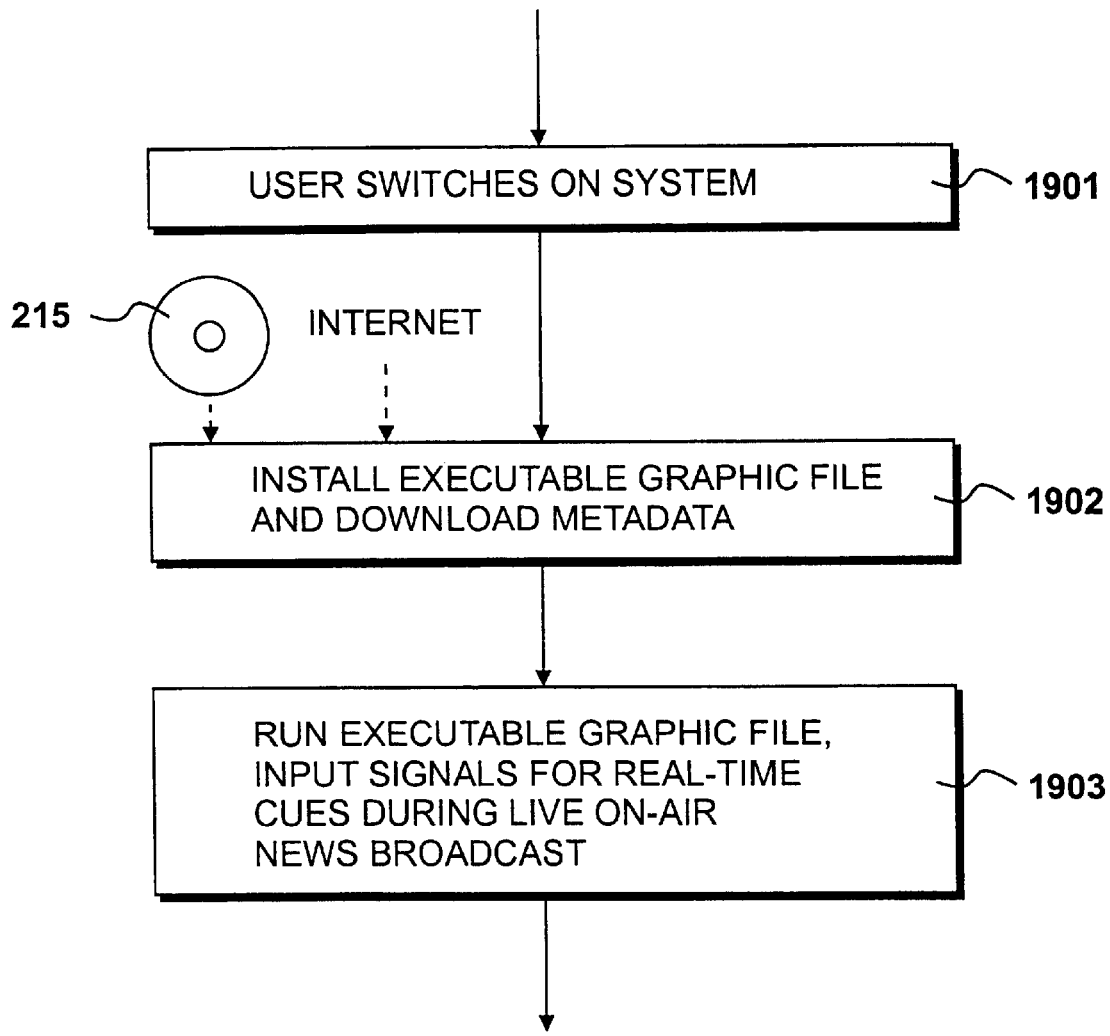
FIG. 19 details workflow performed by a user operating the animation rendering workstation shown in FIG. 18, including a step of running an executable graphic file.

The workflow associated with an operator of the processing system 1801 shown in FIG. 18 is detailed in FIG. 19. At step 1901 the user switches on the system prior to broadcast. At step 1902 the executable graphic file 803 is installed, either from the CD-R disc 215 or from the Internet. Alternatively the graphic file could be received from a local or networked hard disc drive. Also, in this step, metadata for each news item is loaded from the newsroom 103. At step 1903 the executable graphic file 803 is executed, the operator inputs cue signals for each instantiated animation, and the live broadcast proceeds.

Throughout the news program, the processing system 1801 generates digital animated images that are composited with signals from the camera 1806. Most of the time, the only part of the camera image that is retained is that of the image of the newsreader herself. The monitor 1802, shown in FIG. 18, provides a user interface for selecting cue points throughout the program, while the broadcast monitor shows the resulting image as the broadcast proceeds.

In an alternative embodiment, external broadcast video hardware is used to generate composite image signals from the graphics signals generated by processing system 1801, and the video signals produced by the camera 1806.

Figure 20:
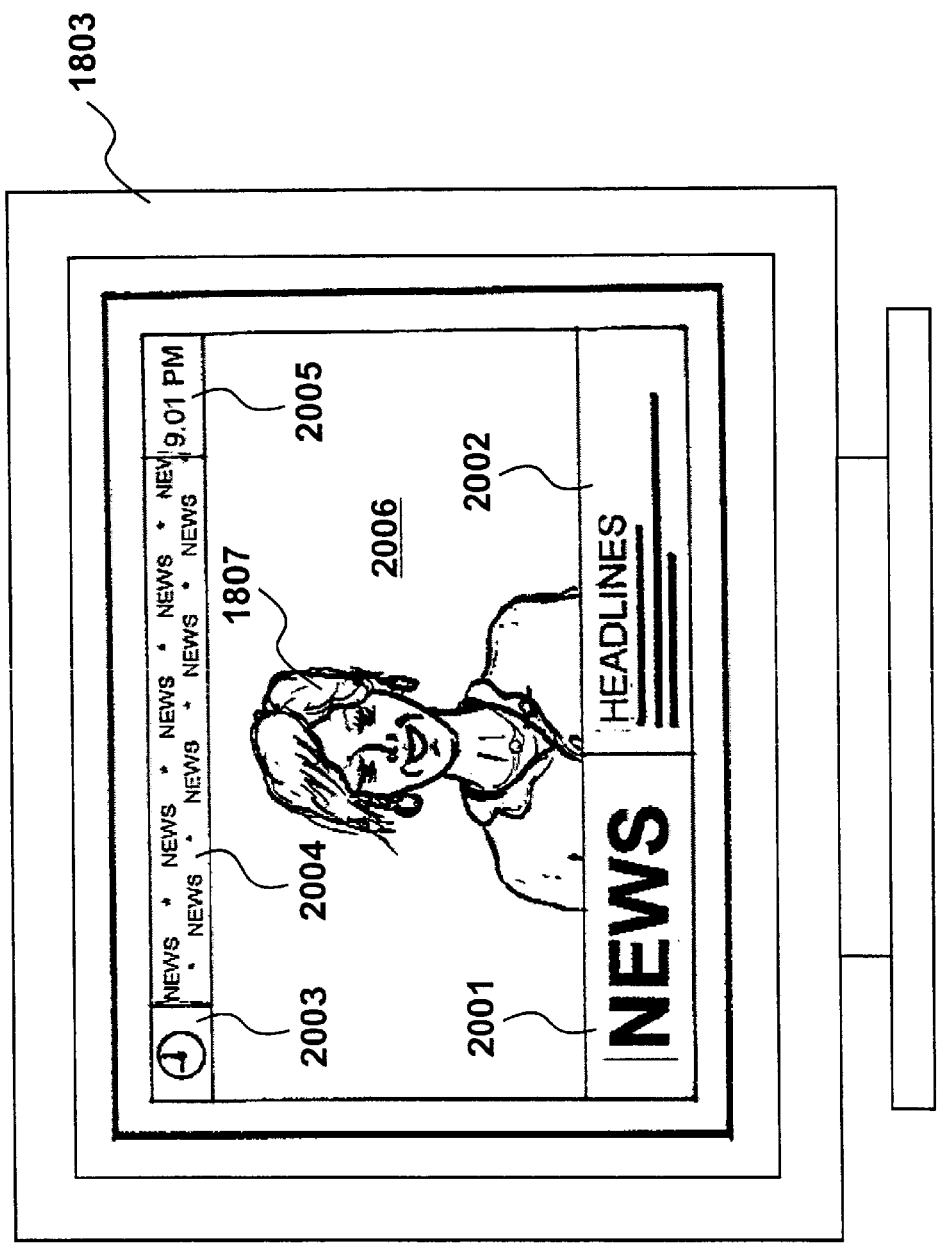
FIGS. 20 to 23 show screenshots of animations as they would be previewed on the broadcast monitor shown in FIG. 18.

Screenshots of several sections of the news program are shown in FIGS. 20 to 23. In FIG. 20 the main shot of the program is shown, including the newsreader 1807 located centrally, with several graphical components 2001 to 2005 superimposed upon the image. The blue screen background 1809 has been replaced by a more aesthetically pleasing background 2006. Several of the graphical components 2003, 2004 and 2005 are animated, and change their appearance as the broadcast proceeds.

Figure 21:
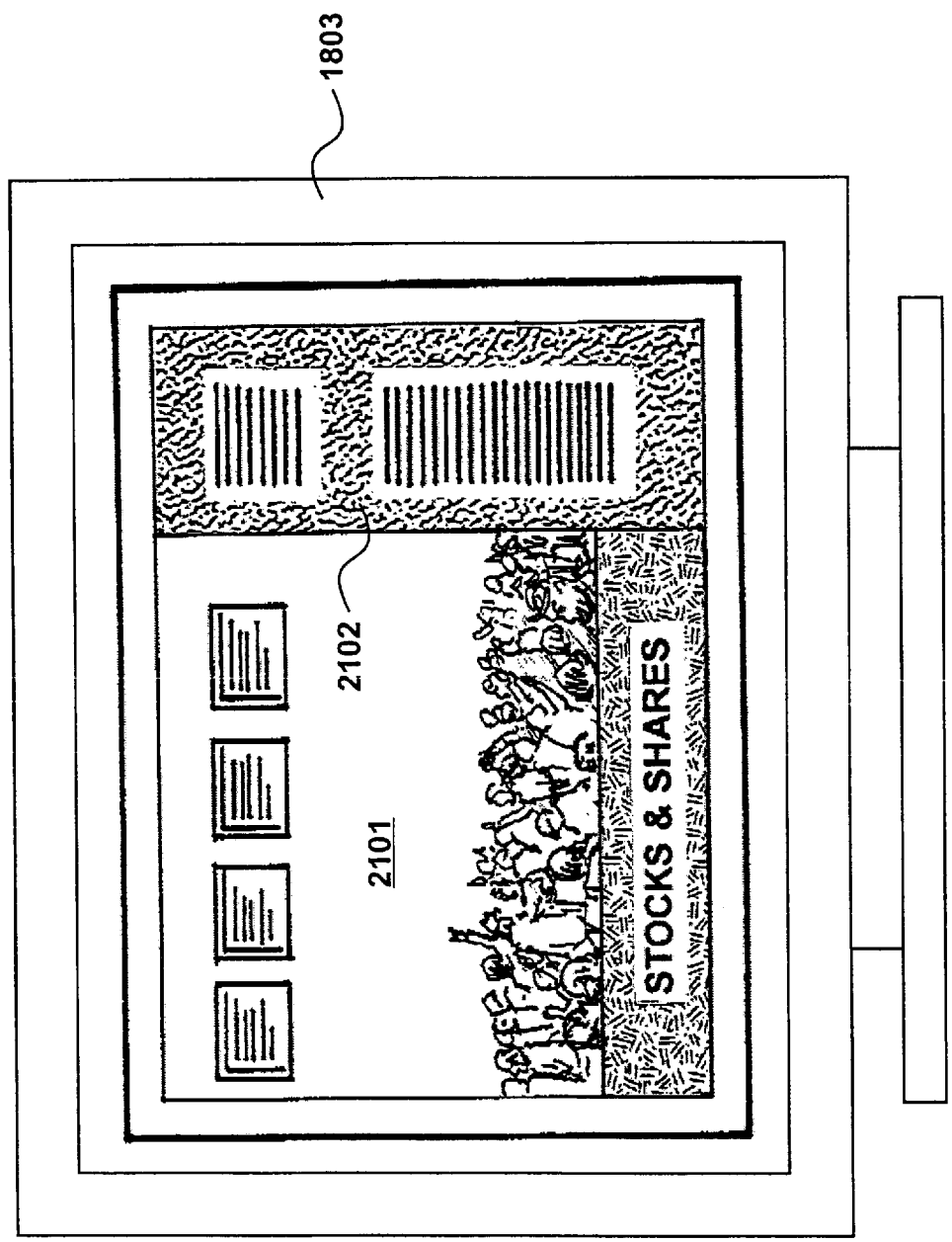

FIG. 21 shows a later part of the program, in which a camera image 2101 has been combined with different graphical components, which may also be animated. The switch to this scene requires that the digitally generated animated portions of the scene are switched at exactly the same time as the video source. This simultaneous switching is performed by setting a cue point that is triggered automatically, rather than by manual user operation of the keyboard 1804. An automatic trigger can be supplied via a studio automation communications protocol that uses an Ethernet network to synchronise and communicate between the several hardware components of a television studio. For example, the producer can initiate a crossfade between video sources, and have this result in a command to crossfade simultaneously between graphic animations generated by the processing system 1801. A suitable protocol for this type of operation is the Media Object Server (MOS) protocol.

Figure 22:
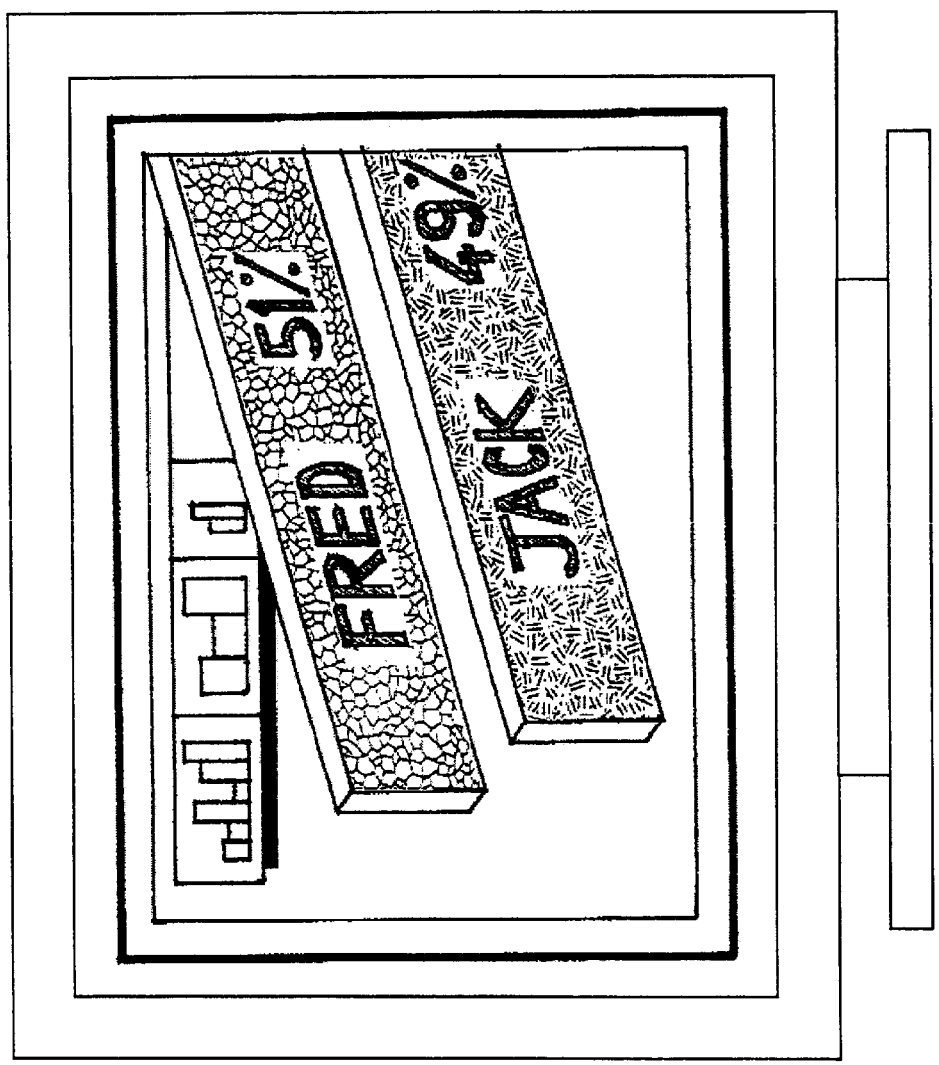
Figure 23:
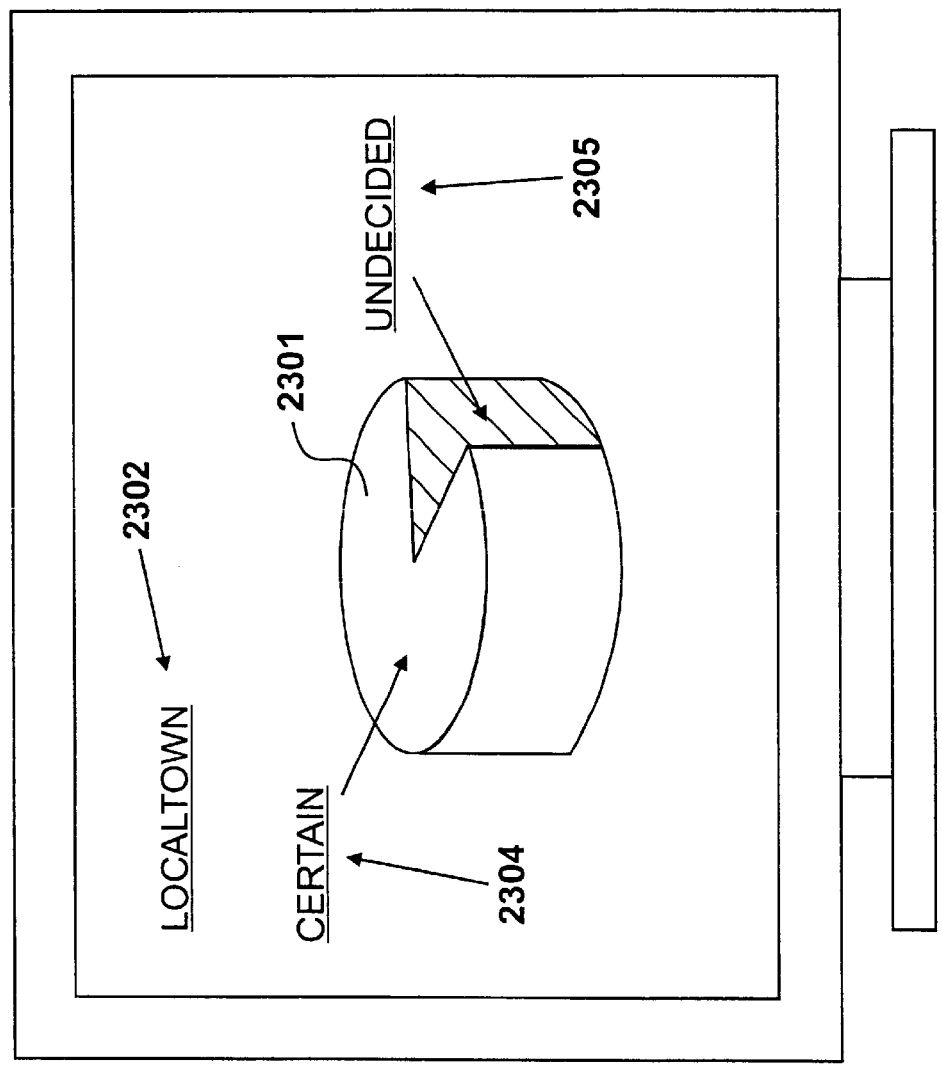

A typical animation from an election news item is shown in FIG. 22, in which two animated three-dimensional bar graphs are rendered, against a backdrop of other graphical data. In FIG. 23, the animation resulting from the metafile shown in FIGS. 9 and 10 is illustrated. This includes a pie chart 2301, with a name 2302 and labels 2304 and 2305 for each portion. Here it will be noted that many design details have been predetermined by the originator of the graphic data, such as the size and color and overall appearance of the pie chart 2301.

The unlocked parameters that were provided in the metadata 605 for editing, are only those that are minimally required for the construction of a news item. This minimises the complexity of generating an animation for a news story—the same basic design can be reused whenever required. If, for example, the producer requires some inaccessible characteristic to be changed, this requirement is passed on to the animation design house 101, and new graphic data and executable graphic file 803 are produced.

The processing system 1801 shown in FIG. 18 is a Silicon Graphics Onyx2™ processing system, details available from http://www.sgi.com. The components of the processing system 1801 are detailed in FIG. 24. The processing system contains eight main processing modules. Each module comprises four processors 2401, 2402, 2403 and 2404. Each processor is a MIPS R12000 64 bit processor. Each processor has an on-chip primary instruction and data cache, as well as a larger separate secondary cache circuit 2405. Each processing module includes one gigabyte of main memory 2406 and a switch 2407.

The four processors 2401, 2402, 2403 and 2404 are connected together in a symmetric multi-processing (SMP) array, and have equal access to the local memory 2406. The main memories on each of the processing modules are connected to each other via the switches 2407, 2408. All the memory circuits of the modules are combined into a unified addressable space. However, when a processor requires access to an address in memory that is not local, this increases memory access time. This is known as a Non-Uniform Memory Architecture (NUMA). An operating system running on this type of architecture takes account of this non-uniformity of access times and has a process scheduling algorithm that seeks to localise memory access for a running process (or thread) within the same or nearby processing modules.

A total of thirty-two processors is provided in the processing system 1801, and this provides sufficient processing power to render animations of considerable complexity, and to a high level of quality. The availability of this level of processing also ensures that animations will be rendered in real time. Complex designs can be created on processing systems of lower processing capacity, such as the processing system 209 shown in FIG. 5. However, in order to guarantee real time rendering, a more powerful processing system is typically used when generating animations for live broadcast.

In addition to the processing modules, the processing system 1801 also includes a storage module 2411, a graphics module 2412 and an input output module 2413. The storage module 2411 includes a redundant array of inexpensive disks 2414 and a CDROM drive 2415. These are connected to a switch 2416 via a SCSI interface 2417. The graphics module 2412 includes several graphics processing circuits and a switch 2418. The graphics module supplies output video signals to the monitor 1802, the broadcast preview monitor 1803, and in digital form to the broadcast mixing and production stage of the television studio 104. The graphics module 2412 also receives video signals from the camera 1806, which are combined with animation data to generate the broadcast video signals. The input output module 2413 facilitates Ethernet, mouse and keyboard connections. It is also able to receive serial data from the camera 1806, defining camera pan, lens zoom and focus, and so on, for synchronising camera position and characteristics with possible virtual views created as part of an interactive animation, thereby providing a virtual studio. A virtual studio of this type is considered to be generated as a result of rendering an animation with the appropriate interactive characteristics. The input output module 2413 includes a switch 2419, to provide integration with the rest of the modules in the processing system 1801.

In alternative embodiments other processing systems are used which have fewer processors than processing system 1801. For example, in one embodiment a processing system is used which has four processors. However, the larger processing power of system 1801 has benefits when dealing with the large amounts of data involved, at high speeds.

Figure 24:
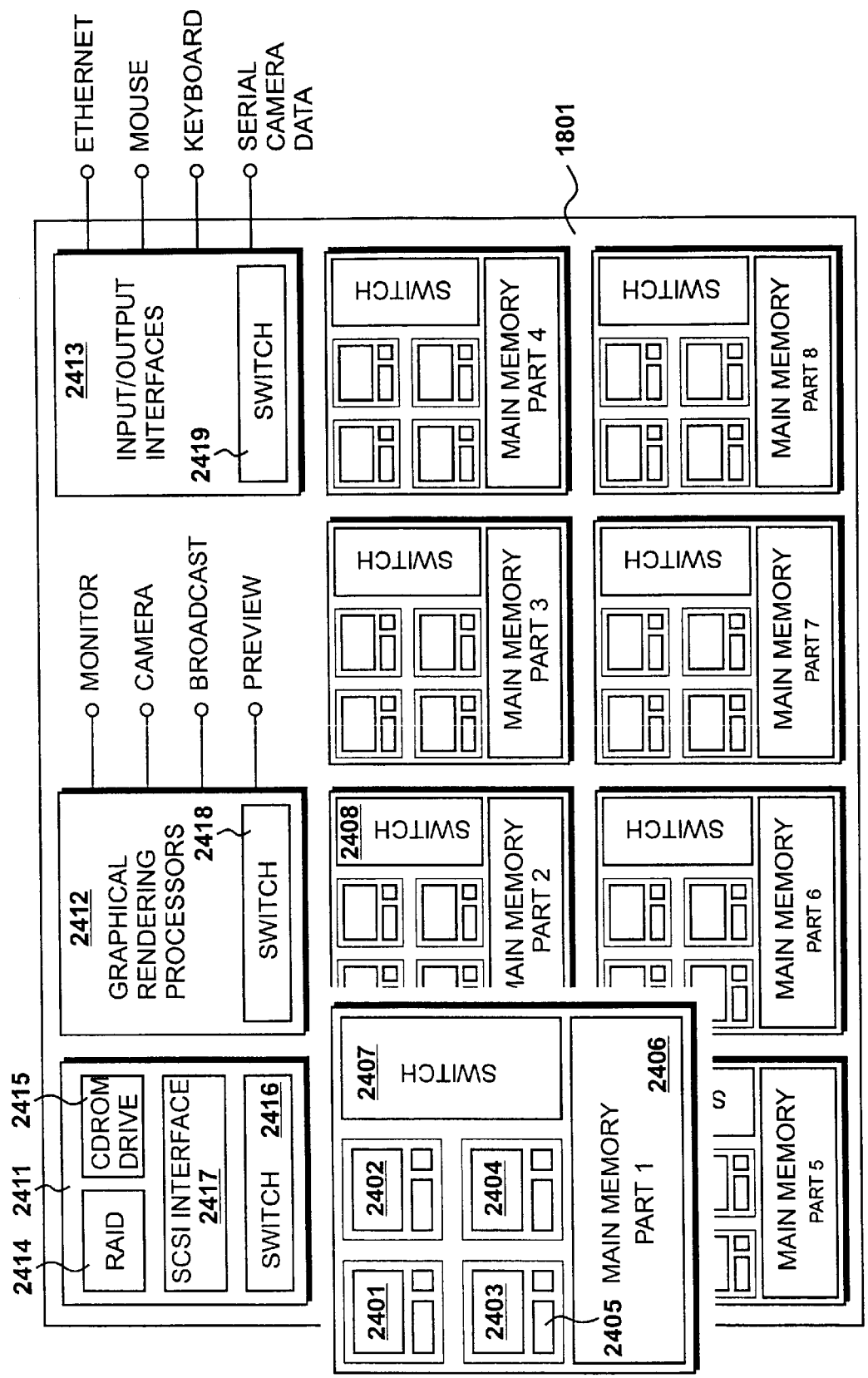
FIG. 24 details components of the processing system shown in FIG. 18, including a distributed main memory.
Figure 25:
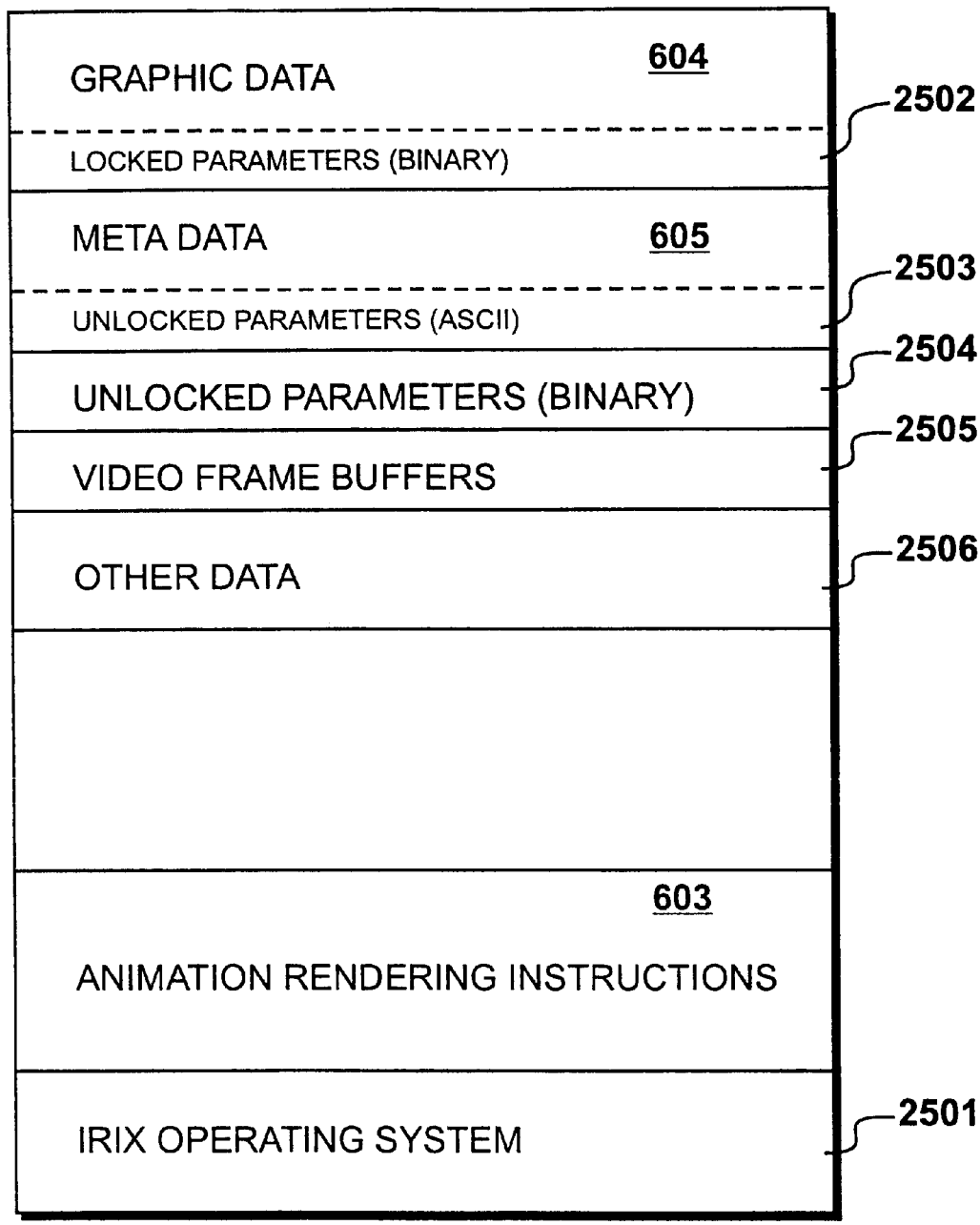
FIG. 25 details the contents of the distributed main memory shown in FIG. 24.

The contents of the main memory of the processing system shown in FIG. 24 are detailed in FIG. 25. An Irix operating system 2501 provides common operating system utilities and scheduling for processes. Animation rendering instructions 603 perform rendering of the graphic data in real time. Graphic data 604 includes locked parameters 2502 in binary format. Metadata 605 includes unlocked parameters 2503 in ASCII format. The unlocked parameters are also stored in binary equivalent form at 2504. At 2505 several video frame buffers are provided to ensure efficient pipelining of rendering operations so as to exploit the full potential of the processing capacity of the processing system 1801. Other data includes state data used by the instructions 2501 and 603.

Figure 26:
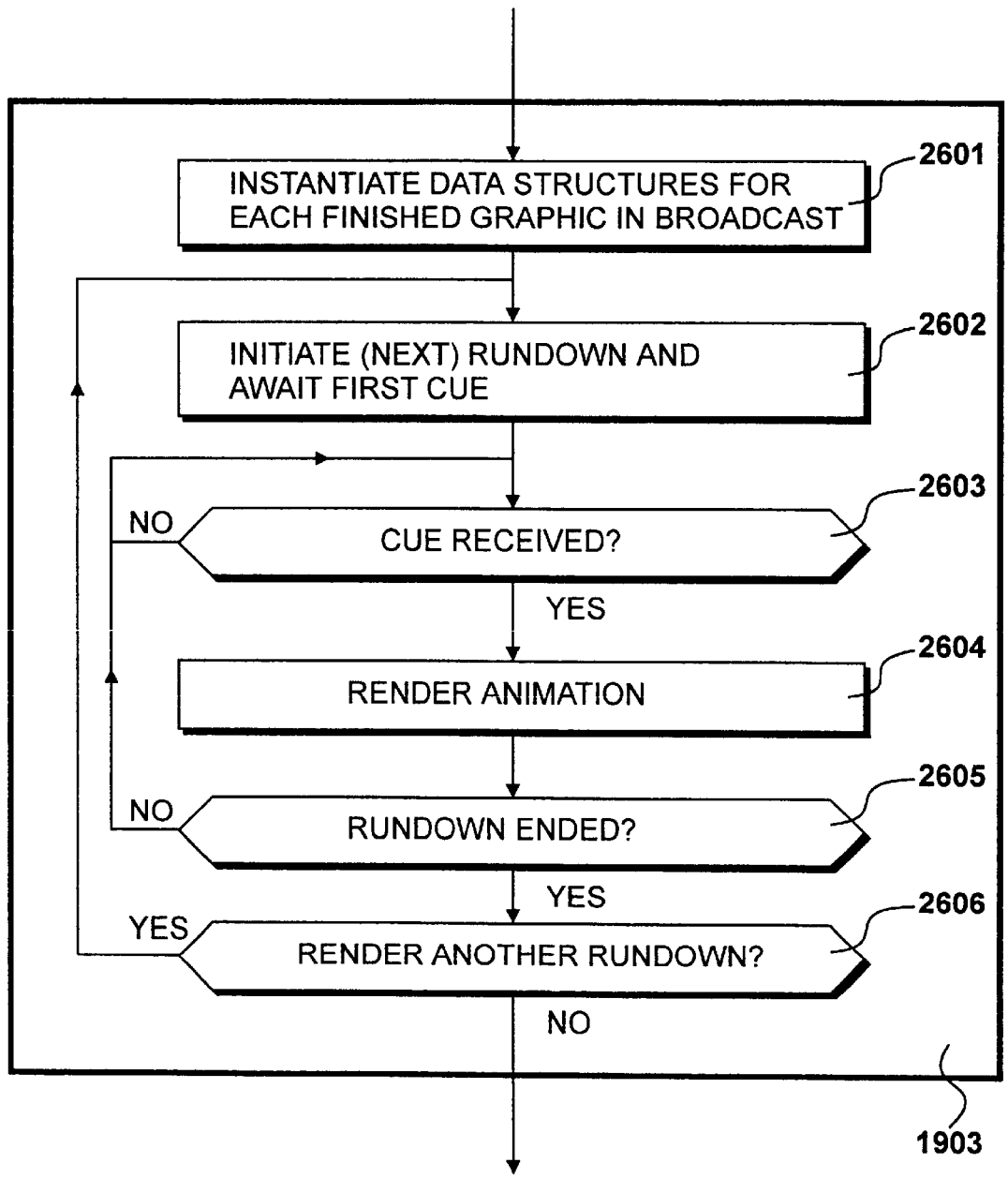
FIG. 26 details the step of running an executable graphic file shown in FIG. 19, including a step of instantiating data structures.

The step 1903 of running an executable graphic file shown in FIG. 19, is detailed in FIG. 26. At step 2601 data structures for each of several finished graphics in a broadcast are instantiated. As stated previously, each metafile has a line 902 which effectively instantiates a graphic with particular modifiable attributes as defined by the unlocked parameters in the metafile 801. At step 2602 the next rundown in the broadcast is initialised before it is required, and begins waiting for its cue. As mentioned earlier, a rundown is defined by a sequence of graphics, and in the present embodiment, the rundown data also includes the identity of which metafile is to be referenced when rendering each graphic. At step 2603 a question is asked as to whether the cue has been received. If not, this question is asked again. Eventually, once the cue has been received, control is directed to step 2604. A cue may be in the form of a manual user operation, for example pressing a key on the keyboard 1804, or remotely or automatically triggered using the MOS commands over the studio's Ethernet network. At step 2604 the next animation in the sequence is rendered. At step 2605 a question is asked as to whether the rundown is complete. If not, control is directed to step 2603, and the next cue is awaited. When waiting for the next cue, it is likely that rendering will continue, perhaps indefinitely, until the next cue is received. At step 2605, when the current rundown has completed, a question is asked at step 2606 as to whether there is another rundown in the current program sequence. If so, control is directed to step 2602. Alternatively this completes the steps performed when running the executable graphic file 803.

Figure 27:
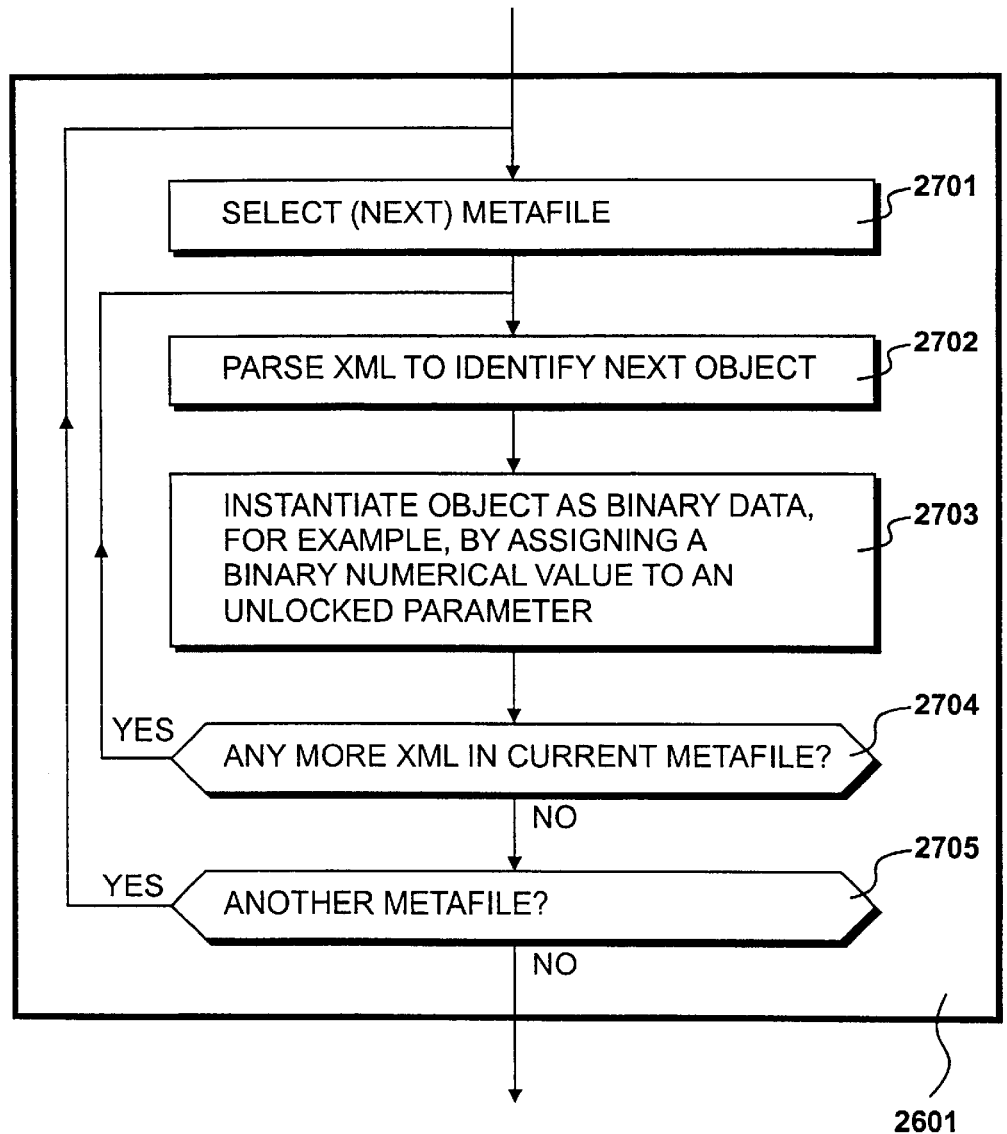
FIG. 27 details the step of instantiating data structures shown in FIG. 26.

The step of instantiating data structures 2601 shown in FIG. 26, is detailed in FIG. 27. At step 2701 the first metafile is selected. Steps 2702 to 2704 then analyse the selected metafile. At step 2702 the ASCII encoded XML is parsed to identify the next parameter object. At step 2703 the object is instantiated as binary data, for example, by assigning a binary numerical value to an unlocked parameter. Step 2703 results in the translation of ASCII formatted unlocked parameters 2503 into their binary equivalents 2504, so that they can be directly accessed during the mathematical procedures used when rendering animated graphical components 2003, 2004, 2005. At step 2704 a question is asked as to whether there is any more XML left to parse in the current metafile. If so, control is directed to step 2702, where the next parameter object is selected. Alternatively control is directed to step 2705, where a question is asked as to whether another metafile is available for the current sequence of rundowns that are to be rendered during the broadcast. If so, control is directed to step 2701. Alternatively, this completes the sequence of steps required for instantiating data structures for each rundown.

Figure 28:
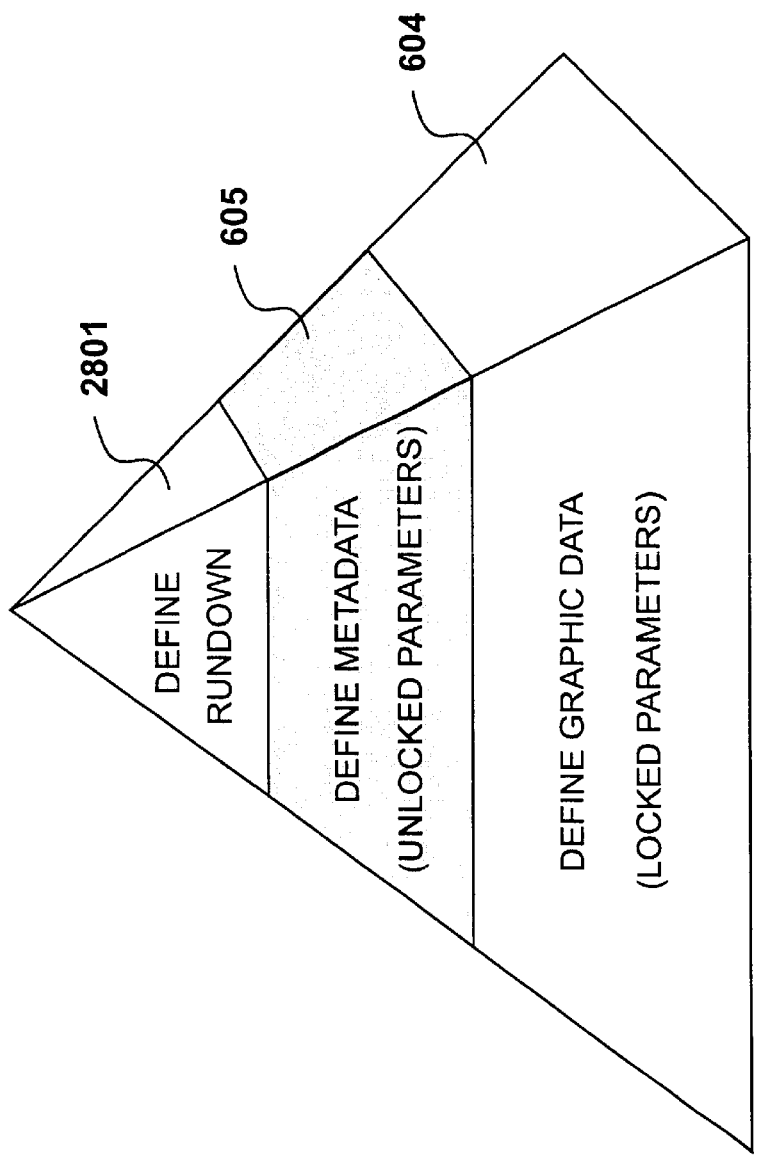
FIG. 28 shows the levels of user access to animation data.

The levels of user access are summarised in FIG. 28. Graphic data 604 is defined by the designer of an animation, at a first level of access. This is a complex task, and requires the definition of many parameters. The designer designates certain parameters as being unlocked. The designer may create an unlocked parameter whose modification results in a complex manipulation of several variables within an animation. Either way, the designer has the ability to control and select, not only the design of the animation, as encoded within the graphic data 604, but also the way in which users can interact with this animation at a second level of access, and set it up to produce customised versions of their own, each time the graphic data is used.

The metadata 605 describes only these unlocked parameters, and therefore makes it possible to modify animation characteristics extremely quickly at the second level of user access. The time and effort required to do this is much less than the effort required to define or even selectively modify the graphic data at the first level of user access.

A limited amount of data, referred to as rundown data 2801 is received in order to define how the graphics should be brought on air. The rundown data includes the triggers, manual or automatic, that cause the animation to commence, information defining the sequence of graphics to be animated, along with details of which metafiles are to be used, and information defining the transitions between graphics.

In addition, the rundown data might also include triggers of when queries to database servers might be executed to ensure the timely retrieval from the database. The data stored in such a database may be generated at the TV studio or by compiling information received from viewers, for instance via the internet or a back channel. In such a case, the query for the database may be stored in a metafile, while the timing of when the query is executed is stored in the rundown.

The graphic data 604 may be considered as defining the first level of user access. The metadata may be considered as defining the second level of user access. The rundown data is the final level, where minimal additional data is required in order to synchronise the animation with events and information that occur unpredictably during animation execution.

An overview of a preferred embodiment of the invention is illustrated in FIG. 29. An animation comprises a sequence of animated visual images in which each successive image is different from the last in order to provide the illusion of movement. In this respect, an animation can be considered as comprising a sequence of image frames. Definition of this sequence is done with reference to complex data structures that define the appearance, usually in three dimensions, of objects, surfaces and text characters. Graphic data 604 defines the majority of these details, considered as the first characteristics of the resulting animation. The graphic data 604 also contains references to second characteristics, so in some respects the graphic data does not entirely define an animation. However, it may certainly be considered as animation data, as it contains most of the characteristics of the resulting animation.

It is advantageous to restrict end-user access to first characteristics, as these first characteristics may contain valuable copyrighted graphic designs. For example, trade marks, trade names, recognisable animated characters, and possibly a studio having a well known highly recognisable design. The graphic data 604 is scrambled 2901, prior to combining it 802 with rendering instructions 603. The combination process 802 may include compilation of source code, or binary combination of pre-existing compiled binary executable instructions for the target processing system 1801. This results in a locked executable graphic file 2902. The executable graphic file may have a built-in date, so that it may only be executed for rendering the animation before a final date. The processes of scrambling 2901 and combination 802, result in an executable animation that would be extremely difficult to reverse engineer, thus controlling the ownership of copyrighted material. The metadata 605 is saved and distributed to clients 2903, 2904 and 2905, as a metafile 801, containing the unlocked parameters that are referenced in the graphic data 604. Each client can create as many different versions 2906, 2907 of the metafile 801 as required, up until the date of expiry on the executable animation file 2902. The executable animation file is distributed to each client 2903 to 2905 in its exact same form. No modification is possible by the client. Modification of the executable animation file 2902 is only possible by those with access to the original graphic data 604, at the first level of user access. Each client is given a precisely controlled level of customisation for the animation, which is performed at a second level of user access 605.

The main embodiment therefore locks selected parameters by the scrambling process 2901 and the subsequent combining process 802, but other procedures are envisaged which will provide locking of parameters which are to be accessed at the first level of access only. For example, in an alternative embodiment, the scrambling procedure 2901 is omitted, but the process 802 of combining the graphic data 604 with rendering instructions 603 produces compiled binary executable instructions for the processing system 1801. Since the parameters relating to first characteristics of the animation are included within these executable instructions, the combining process itself produces a barrier to further editing of said parameters.

What is claimed:

1. An image data processing system for generating an executable animation file, comprising:
    data storage means storing first graphical data, second graphical data and rendering instructions; and
    processing means configured to combine said first graphical data and said rendering instructions, wherein
        said second graphical data comprises unlocked parameters defining second characteristics of said animation;
        said first graphical data comprises locked parameters defining first characteristics of an animation and references to said unlocked parameters;

said combining process results in an executable animation file being generated, containing within it references to said unlocked parameters, such that:
said first animation characteristics are editable only at a first level of user access, prior to said combination of first graphic data and rendering instructions; and
said second animation characteristics are editable at a second level of user access, after said combining has taken place.

2. An image data processing system according to claim 1, wherein said processing means is configured to execute steps to scramble the first graphic data contained in the executable file.

3. An image data processing system according to claim 1, wherein said second graphical data comprises metadata, and for each of a plurality of unlocked parameters said metadata contains a specific value and an identifying means for identifying the corresponding unlocked parameter, to allow the construction of an interface for said unlocked parameters for user modification of said second animation characteristics.

4. An animation editing system according to claim 3, wherein said identifying means is a description of the corresponding parameter.

5. An animation editing system according to claim 3, wherein said metadata includes a defined range of permissible values for each parameter.

6. An animation editing system according to claim 3, wherein said metadata is encoded in XML (Extensible Markup Language).

7. An animation editing system according to claim 3, wherein said system is configured to transmit said metadata over a computer network separately from said graphic data.

8. An animation editing system according to claim 1, wherein said animation file is executable only before a defined date.

9. An animation editing system according to claim 1, wherein said rendering instructions include instructions to combine said rendered animation with other moving image data.

10. A method of generating an executable animation file in an image data processing system, in which first graphical data, second graphical data and rendering instructions are stored upon a data storage medium and these are processed by processing means in accordance with processing instructions to combine said first graphical data with instructions to generate an executable animation file, in which:
said first graphical data comprises locked parameters defining first characteristics of an animation and references to second characteristics of said animation;
said second graphical data comprises unlocked parameters defining said second characteristics of said animation; wherein
said combining process results in an executable animation file being stored, containing within it references to said unlocked parameters, such that:
said first animation characteristics are locked by said combining process and are editable only at a first level of user access, prior to said combination of first graphic data and rendering instructions; and
said second animation characteristics are editable at a second level of user access, after said combining has been performed.

11. A method of generating an executable animation file according to claim 10, wherein said processing means is configured to execute steps to scramble the first graphic data contained in the executable file.

12. A method of generating an executable animation file according to claim 10, wherein said second graphical data comprises metadata, and for each of a plurality of unlocked parameters said metadata contains a specific value and an identifying means for identifying the corresponding unlocked parameter, to allow the construction of an interface for said unlocked parameters for user modification of said second animation characteristics.

13. A data structure on a machine-readable medium, containing instructions for processing means in an image data processing system comprising said processing means and data storage means, in which said instructions instruct said processing means to perform processing operations for generating an executable animation file, by combining first graphical data stored upon said data storage means with rendering instructions, and for generating a second graphical data file, wherein
said first graphical data comprises locked parameters defining first characteristics of an animation and references to second characteristics of said animation;
said second characteristics being defined by second graphical data comprising a plurality of unlocked parameters; wherein
said combining process results in an executable animation file being generated, containing within it references to said unlocked parameters, such that:
said first animation characteristics are editable only at a first level of user access, prior to said combination of graphic data and rendering instructions; and
said second animation characteristics are editable at a second level of user access, after said combining has taken place.

14. A data structure on a machine-readable medium according to claim 13, wherein said instructions instruct said processing means to execute steps to scramble the first graphic data contained in the executable file.

15. A data structure on a machine-readable medium according to claim 13, wherein said second graphical data comprises metadata, and for each of a plurality of unlocked parameters said metadata contains a specific value and an identifying means for identifying the corresponding unlocked parameter, to allow the construction of an interface for said unlocked parameters for user modification of said second animation characteristics.

16. An image processing system for generating animated visual images, including processing means and data storage means, in which an executable animation file and a editable data file are stored upon said data storage means, wherein
said executable animation file includes rendering instructions and animation data which in combination define first characteristics of an animation, said animation data including locked animation parameters and references to unlocked animation parameters;
said editable data file comprises said unlocked animation parameters defining second characteristics of said animated images such that said second characteristics are modifiable without changing said executable animation file; and
said processing means is configured to render a sequence of image frames by processing said editable data file in accordance with said rendering instructions in the executable animation file.

17. An image processing system according to claim 16, wherein said editable data file comprises metadata, and for each of said unlocked parameters said metadata has a definition comprising a specific value and an identifying means for identifying the corresponding unlocked parameter, to allow the construction of an interface for said unlocked parameters for user modification of said second animation characteristics.

18. An image processing system according to claim 17, including apparatus for editing an unlocked parameter, by steps of:
(a) reading an unlocked parameter definition from said editable data file;
(b) generating an interface for said unlocked parameter by analysing said parameter definition;
(c) modifying the unlocked parameter in response to user interactions with said generated interface; and
(d) updating said editable data file with said modified parameter value.

19. An image processing system according to claim 16, wherein said metadata is in XML (Extensible Markup Language).

20. A data structure on a machine-readable medium, containing instructions for processing means in an image processing system comprising said processing means and data storage means, in which said instructions instruct said processing means to perform processing operations for generating animated visual images, by processing graphical data with an editable data file stored upon said data storage means;
said data structure includes rendering instructions and animation data which in combination define first characteristics of an animation, said animation data including locked animation parameters and references to unlocked animation parameters; and
said editable data comprises values for said unlocked parameters defining second characteristics of said animation data; wherein
said rendering instructions for said processing means render a sequence of image frames by processing said editable data in combination with said animation data.

21. A data structure on a machine-readable medium according to claim 20, wherein said editable data file comprises metadata, and for each of said unlocked parameters said metadata has a definition comprising a specific value and an identifying means for identifying the corresponding unlocked parameter, to allow the construction of an interface for said unlocked parameters for user modification of said second animation characteristics.

22. A data structure according to claim 21, additionally including instructions for editing an unlocked parameter, by steps of:
(a) reading an unlocked parameter definition from said metadata file;
(b) generating an interface for said unlocked parameter by analysing said parameter definition;
(c) modifying the unlocked parameter in response to user interactions with said generated interface; and
(d) updating said metadata file with said modified parameter value.

23. A data structure according to claim 20, including conditional instructions that prohibit rendering after a certain date.

24. A data structure according to claim 21, including instructions for interpreting said metadata as XML (Extensible Markup Language).

* * * * *